United States Patent [19]

Van Lengerich et al.

[11] Patent Number: 5,071,668

[45] Date of Patent: * Dec. 10, 1991

[54] EXTRUSION BAKING OF COOKIES CONTAINING HEAT AND SHEAR SENSITIVE ADDITIVES

[75] Inventors: Bernhard Van Lengerich, Ringwood, N.J.; Cathryn C. Warren, St. Louis, Mo.

[73] Assignee: Nabisco Brands, Inc., Parsippany, N.J.

[*] Notice: The portion of the term of this patent subsequent to Mar. 12, 2008 has been disclaimed.

[21] Appl. No.: 489,258

[22] Filed: Mar. 5, 1990

Related U.S. Application Data

[63] Continuation-in-part of Ser. No. 363,175, Jun. 7, 1989, and a continuation-in-part of Ser. No. 362,670, Jun. 7, 1989, and a continuation-in-part of Ser. No. 362,746, Jun. 7, 1989, and a continuation-in-part of Ser. No. 362,471, Jun. 7, 1989, and a continuation-in-part of Ser. No. 362,577, Jun. 7, 1989, and a continuation-in-part of Ser. No. 362,747, Jun. 7, 1989, and a continuation-in-part of Ser. No. 362,472, Jun. 7, 1989.

[51] Int. Cl.$^5$ ............................................. A21D 8/00
[52] U.S. Cl. ................................... 426/549; 426/72; 426/518; 426/552
[58] Field of Search .................. 426/549, 96, 72, 552, 426/518

[56] References Cited

U.S. PATENT DOCUMENTS

| | | | |
|---|---|---|---|
| 1,625,022 | 4/1927 | Fousek. | |
| 2,120,138 | 6/1938 | Mathews et al. | 99/81 |
| 2,183,693 | 12/1939 | Rasch | 107/14 |
| 2,488,046 | 11/1949 | Werner et al. | 107/29 |
| 2,582,542 | 1/1952 | Hein | 107/29 |

(List continued on next page.)

FOREIGN PATENT DOCUMENTS

| | | |
|---|---|---|
| 1247926 | 1/1989 | Canada ............ 113/ |
| 0052046 | 5/1982 | European Pat. Off. . |
| 0098642 | 1/1984 | European Pat. Off. . |
| 102232 | 3/1984 | European Pat. Off. . |
| 0134322 | 3/1985 | European Pat. Off. . |
| 0145550 | 6/1985 | European Pat. Off. . |
| 0213007 | 3/1987 | European Pat. Off. . |
| 0251375 | 1/1988 | European Pat. Off. . |
| 0252270 | 1/1988 | European Pat. Off. . |
| 0266958 | 5/1988 | European Pat. Off. . |
| 0275878 | 7/1988 | European Pat. Off. . |
| 0296039 | 12/1988 | European Pat. Off. . |
| 3238791 | 4/1984 | Fed. Rep. of Germany . |
| 2602398 | 2/1988 | France . |
| 0173040 | 9/1984 | Japan . |
| 0241841 | 11/1985 | Japan . |
| 291249 | 8/1985 | Netherlands . |
| 0558141 | 12/1943 | United Kingdom . |
| 1175595 | 12/1969 | United Kingdom . |
| 1254562 | 11/1971 | United Kingdom . |
| 1471108 | 4/1977 | United Kingdom . |
| 1561190 | 2/1980 | United Kingdom . |
| 2131670 | 6/1984 | United Kingdom . |
| 2132868 | 7/1984 | United Kingdom . |
| 2136666 | 9/1984 | United Kingdom . |
| 8606938 | 12/1986 | PCT Int'l Appl. . |

OTHER PUBLICATIONS

Anderson et al., "Gelatinization of Corn Grits by Roll Cooking Extrusion Cooking and Steaming," *Die Strake* 22, Jahrg, No. 4, pp. 130–134.

Anderson et al., "The Terminology and Methodology Associated with Basic Starch Phenomena," *Cereal Foods World*, vol. 33, No. 3, p. 306 (Mar. 1988).

Atwell et al., "The Terminology and Methodology Associated with Basic Starch Phenomena," *Cereal Foods World*, vol. 33, No. 3, p. 306 (Mar. 1988).

Continuous Twin-Screw Processing—Future Oriented Technology, Werner & Pfleiderer Corporation, 663 East Cresent Avenue, Ransey, N.J. (undated).

*Koch-Und Extruder-Techniken*, "Biscuits," Internationales Susswaren-Institut (1982).

Leung et al, "Storage Stability of a Puff Pastry Dough with Reduced Water Activity," *J. Food Science*, vol. 49, No. 6, p. 1405 (Nov., Dec. 1984).

Lorenz et al, "Baking with Microwave Energy," *Food Technology*, pp. 28–36 (Dec. 1973).

Mercier et al, *Extrusion Cooking*, pp. 347–353 and 404–415 (1989).

Nestl, Birgit, Doctoral Thesis entitled "Formula and Process Optimization for the Extrusion of Baked Goods Under Particular Consideration of Various Lipids and Sweeteners (Dietetic Products and Products with Different Nutritional Value)," Justus-Liebig, University of Giessen, Giessen, W. Germany (filed Mar. 1989).

Processing: Extruded Snacks, Werner and Pfleiderer, GmbH, Postaach 30 1220 Theodorstrasse 10 7000 Stuttgart 30, West Germany (undated).

Rossen et al, "Food Extrusion," *Food Technology*, pp. 46–53 (Aug. 1973).

Sanderude, K., "Continuous Cooking Extrusion: Benefits to the Snack Food Industry," *Cereal Science Today*, vol. 14, No. 6, pp. 209–210 and 214 (Jun. 1969).

(List continued on next page.)

*Primary Examiner*—Donald E. Czaja
*Assistant Examiner*—Mary S. Mims

[57] ABSTRACT

An extrusion processed cookie is produced having shear sensitive particulates and/or heat sensitive additions uniformly dispersed therein. A dry flour blend, including flour, dry milk solids and salt is added to a blending zone of a cooker-extruder with a fat or shortening. The mixture is blended and heat-treated in a heating zone of the extruder under high temperatures without fat separation to form a heat-treated mass. The heat-treated mass is cooled in a cooling zone followed by the addition of a sugar, heat sensitive and/or shear sensitive ingredient to form a cookie composition. Water is also introduced to the cooling zone in an amount effective to produce a dough-like consistency. The heat-treated cookie composition is extruded and shaped into an unleavened and unexpanded cookie dough piece. The cookie pieces are then leavened by heating in a convection, microwave or radio frequency oven to produce a leavened cookie having a crumb-like structure.

31 Claims, No Drawings

OTHER PUBLICATIONS

Unique Cooker Extruder, *Food Engineering Intl.*, pp. 41–43 (May 1983).

Woollen, A., "Higher Productivity in Crispbread", *Cereal Foods World*, vol. 30, No. 5, pp. 333–334 (May 1985).

U.S. PATENT DOCUMENTS

| Number | Date | Name | Class |
|---|---|---|---|
| 2,838,012 | 6/1958 | Weibenmiller et al. | 107/29 |
| 2,838,013 | 6/1958 | Weidenmiller et al. | 107/29 |
| 3,021,220 | 2/1962 | Croing et al. | 99/92 |
| 3,064,589 | 11/1962 | Genich | 107/29 |
| 3,158,486 | 11/1964 | Mork et al. | 99/86 |
| 3,195,868 | 7/1965 | Loomans et al. | 259/104 |
| 3,215,094 | 11/1965 | Oldershaw et al. | 107/54 |
| 3,275,449 | 9/1966 | Fritzberg | 99/80 |
| 3,393,074 | 7/1968 | Ehrlich | 99/92 |
| 3,424,590 | 1/1969 | Booras | 99/90 |
| 3,458,321 | 7/1969 | Reinhart | 99/80 |
| 3,462,276 | 8/1969 | Benson | 99/81 |
| 3,480,445 | 11/1969 | Slaybaugh | 99/83 |
| 3,482,992 | 12/1969 | Benson | 99/81 |
| 3,490,750 | 1/1970 | Brennan | 259/104 |
| 3,492,127 | 1/1970 | Ketch et al. | 99/86 |
| 3,615,675 | 10/1971 | Wisdom | 99/83 |
| 3,682,652 | 8/1972 | Corbin et al. | 99/83 |
| 3,692,535 | 9/1972 | Norsby | 99/92 |
| 3,732,109 | 5/1973 | Poat et al. | 99/83 |
| 3,753,729 | 8/1973 | Harms et al. | 99/82 |
| 3,767,421 | 10/1973 | Gulstad et al. | 426/153 |
| 3,767,422 | 10/1973 | Levitz | 426/152 |
| 3,769,034 | 10/1973 | Dreier, Jr. et al. | 426/151 |
| 3,861,287 | 1/1975 | Manser | 99/348 |
| 3,908,025 | 9/1975 | Miller et al. | 426/623 |
| 3,922,369 | 11/1975 | Glicksman et al. | 426/548 |
| 3,987,207 | 10/1976 | Spaeti et al. | 426/99 |
| 4,020,187 | 4/1977 | McCulloch et al. | 426/72 |
| 4,038,481 | 7/1977 | Antrim et al. | 536/56 |
| 4,039,168 | 8/1977 | Caris et al. | 259/9 |
| 4,044,159 | 8/1977 | Lutz | 426/302 |
| 4,044,661 | 8/1977 | Balaz | 99/355 |
| 4,099,455 | 7/1978 | Wenger et al. | 99/450.1 |
| 4,104,463 | 8/1978 | Antrim et al. | 536/56 |
| 4,126,710 | 11/1978 | Jaworshi et al. | 426/589 |
| 4,128,051 | 12/1978 | Hildebolt | 99/348 |
| 4,190,410 | 2/1980 | Rhodes | 425/239 |
| 4,217,083 | 8/1980 | Machuque | 425/198 |
| 4,218,480 | 8/1080 | Dyson et al. | 426/19 |
| 4,219,580 | 8/1980 | Torres | 426/549 |
| 4,225,630 | 9/1980 | Pitchon | 426/623 |
| 4,239,906 | 12/1980 | Antrim et al. | 536/56 |
| 4,245,552 | 1/1981 | Small et al. | 99/483 |
| 4,251,551 | 2/1981 | Van Hulle et al. | 426/94 |
| 4,277,464 | 7/1981 | Reussner et al. | 424/177 |
| 4,285,271 | 8/1981 | Falck et al. | 99/348 |
| 4,318,931 | 3/1982 | Schiffman et al. | 426/243 |
| 4,322,202 | 3/1982 | Martinez | 425/208 |
| 4,344,975 | 8/1982 | Seiler | 426/285 |
| 4,350,713 | 9/1982 | Dyson et al. | 426/243 |
| 4,379,171 | 4/1983 | Furda et al. | 426/291 |
| 4,394,395 | 7/1983 | Rostagno et al. | 426/285 |
| 4,409,250 | 10/1983 | Van Hulle et al. | 426/242 |
| 4,418,088 | 11/1983 | Cantenot | 426/549 |
| 4,431,674 | 2/1984 | Fulger et al. | 426/18 |
| 4,438,146 | 3/1984 | Colby et al. | 426/448 |
| 4,454,804 | 7/1984 | McCulloch | 99/348 |
| 4,455,333 | 6/1984 | Hong et al. | 426/94 |
| 4,465,447 | 8/1984 | Cheigh et al. | 425/72 |
| 4,465,452 | 8/1984 | Masuzawa | 425/308 |
| 4,478,857 | 10/1984 | Stauss | 426/72 |
| 4,492,250 | 1/1985 | Levine | 425/142 |
| 4,497,850 | 2/1985 | Gould et al. | 426/560 |
| 4,500,558 | 2/1985 | Fulger et al. | 426/463 |
| 4,503,080 | 3/1985 | Brabbs et al. | 426/94 |
| 4,563,358 | 1/1986 | Mercer et al. | 426/89 |
| 4,568,550 | 2/1986 | Fulger et al. | 426/19 |
| 4,568,551 | 2/1986 | Seewi et al. | 426/99 |
| 4,608,261 | 8/1986 | MacKenzie | 426/242 |
| 4,618,499 | 10/1986 | Wainwright | 426/283 |
| 4,650,685 | 3/1987 | Persson et al. | 426/285 |
| 4,661,360 | 4/1987 | Smith | 426/94 |
| 4,664,921 | 5/1987 | Seiden | 426/94 |
| 4,668,519 | 5/1987 | Dartey et al. | 425/548 |
| 4,685,878 | 8/1987 | Pinto | 425/202 |
| 4,693,899 | 9/1987 | Hong et al. | 426/94 |
| 4,741,264 | 5/1988 | McPeak | 99/483 |
| 4,752,484 | 6/1988 | Pflaumer et al. | 426/94 |
| 4,756,921 | 7/1988 | Calandro et al. | 426/560 |
| 4,762,723 | 8/1988 | Strong | 426/283 |
| 4,764,388 | 8/1988 | Sullivan et al. | 426/311 |
| 4,770,890 | 9/1988 | Giddey et al. | 426/549 |
| 4,771,915 | 9/1988 | Cand et al. | 222/56 |
| 4,777,057 | 10/1988 | Sugisawa et al. | 426/412 |
| 4,778,690 | 10/1988 | Sadel, Jr. et al. | 426/560 |
| 4,786,514 | 11/1988 | Wiedmann | 426/231 |
| 4,828,853 | 5/1989 | Banks et al. | 426/94 |
| 4,844,937 | 7/1989 | Wilkinson et al. | 426/559 |
| 4,844,938 | 7/1989 | Amamoto et al. | 426/589 |
| 4,851,247 | 7/1989 | Greenhouse et al. | 426/250 |
| 4,892,471 | 1/1990 | Baker et al. | |
| 4,900,572 | 2/1990 | Repholz et al. | 426/282 |
| 4,904,493 | 2/1990 | Petrizelli | 426/549 |
| 4,911,939 | 3/1990 | Lou et al. | 426/241 |
| 4,948,611 | 8/1990 | Cummins | |
| 4,948,612 | 8/1990 | Keller et al. | |
| 4,990,348 | 2/1991 | Spratt et al. | |

EXTRUSION BAKING OF COOKIES CONTAINING HEAT AND SHEAR SENSITIVE ADDITIVES

CROSS REFERENCE TO RELATED APPLICATIONS

This application is a continuation-in-part application of U.S. Ser. No. 363,175, U.S. Ser. No. 362,670, U.S. Ser. No. 362,746, U.S. Ser. No. 362,471, U.S. Ser. No. 362,577, U.S. Ser. No. 362,747, and U.S. Ser. No. 362,472 all filed on June 7, 1989.

FIELD OF THE INVENTION

The present invention relates to a method for the continuous production of cookies having a crumb-like structure containing heat and/or shear sensitive additives using extrusion heating.

BACKGROUND

The commercial production of cookies generally are prepared from sugar, flour, fat or shortening leavening and optional flavors. The ingredients are combined and blended in a suitable blending apparatus in a batch fashion. After the dough is formed, additives such as nuts or chocolate pieces are admixed to uniformly distribute the particles throughout the dough. The dough is then transferred to a suitable shaping and forming apparatus to form the dough pieces. The mixing of the particles must be under low shear conditions to prevent the destruction of the structural integrity of the particles. The integrity of the particles will influence the flavor and the texture of the final product and may inhibit the consumer acceptance of the product.

Processes have been proposed to improve the consumer acceptance of a product by applying the edible particles to the surface of the product during different stages of the formation of the dough piece. Securing the particles to the surface dough has shown to be difficult either before or after baking. During the baking, cooling and packaging stages of the cookie production, large quantities of the edible pieces become dislodged resulting in a product that is unsatisfactory to the consumer. In addition, the edible particle processing stage and loss of the edible particles from the product increase the final manufacturing costs.

In the production of a high oil containing farinaceous composition by extrusion cooking, mobility and immiscibility of the water and oil phases generally increase with increasing temperature. Additionally, the mechanical action of extruder screws tends to increase separation of oil from the remaining cookie mass. The tendency for the oil to separate is at locations within the extruder at which the components are subjected to the highest pressure. Exemplary of high pressure locations in a twin screw extruder are: 1) the space between the extruder screw tips and the die orifice, and 2) the narrowest or more restricted passageways between the left and right hand screw elements.

Oil separation under system pressure (screw or die pressure) can be manifested in extruder surging or uneven mass flow rates from the die. Upon extrusion from the die, separated oil may: 1) appear as a coating on the remaining dough mass, or 2) periodically discharge separately from the remaining dough mass. Non-homogeneous dough production and discontinuous extruder operation may thus result from oil separation. The problem of oil separation increases with increasing oil levels.

Water separation from flour, up to the boiling point of water, is generally not a problem because of the more hydrophilic properties of flour components such as gluten and starch. As flour and water temperatures are raised, increased migration of water into starch granules, protein (e.g. gluten) denaturization, and starch gelatinization tend to occur. The binding or reaction of water with flour components may promote separation of oil: a) by making the flour components more polar or hydrophilic and b) by creating a greater mass of hydrophilic components.

Conventional cookie production involves forming cookie dough preforms or pieces followed by baking of the pieces. Low temperatures, typically at about room temperature, are used to form the dough. The low temperature mixing generally avoids separation of shortening or fat from hydrophilic dough components. While baking temperatures in a conventional oven, such as a band oven, may promote oil separation, there is no mixing or pressing action performed at the baking temperatures. Any oil separation which may occur in such ovens does not generally interfere with continuous operability of the cookie production process as it would in a continuous cooker/extruder process.

In addition to high temperature mixing and high system pressure, the presence of sugar in a cookie dough may also increase oil and water separation. Solubilization of sugars in water increases the relative amount of the hydrophilic mass. This in turn may tend to promote oil separation.

The elimination or significant reduction of added water or a source of added water in a cooker extruder tends to reduce oil separation from hydrophilic cookie dough components at elevated temperatures. However, added water or a source of water is needed in cookie production for formability or machinability of cookie doughs into sheets or pieces at high production rates. Water also helps to disperse cookie ingredients and to promote flavor and color development.

Cooking of dough products at elevated temperatures changes the texture and the flavor of the dough. The temperatures experienced in the baking oven and in a cooker-extruder will develop many of the desirable flavors. However, the cooking temperatures will inherently destroy some of the desirable compositions in the food product. A number of additives are commonly added to dough products to improve the shelf-stability, color, and flavor of the dough product. Typically these additives are combined during the mixing stage of the dough and subjected to the high cooking temperatures. The high temperatures often result in a loss of the activity of the additive. Many flavoring compositions contain volatile compounds which dissipate during baking. Some antioxidants and vitamins may be destroyed during the heating step. The intense heating experienced in a cooker-extruder have limited the use of extruders to compositions that are relatively heat stable. Alternative extrusion cooking methods rely on the short residence time in the extruder or lower the barrel temperature to avoid decomposition.

Efforts to overcome the loss of activity of these compounds usually result in adding excessive amounts of the compound during mixing or, alternatively, applying a coating of the compound over the finished product. These efforts have experienced only limited success in obtaining satisfactory concentrations. For example, many of the concentrated coatings tend to impart a bitter flavor to the food. Applying a coating of the compound does not sufficiently penetrate the interior of the product and produces a high concentration on the surface and low concentration toward the center. In addition, a carrier is often times necessary to apply the compound and further tends to dilute the concentration. When an aqueous solution is sprayed onto the food product, the water must typically be removed to avoid an unacceptable moisture level on the surface. The coating compositions are further exposed to the atmosphere and to sunlight which may degrade or alter their activity over time. In the case of preservatives and antioxidants, it is preferable to have the compounds remain in the active form for an extended period of time to prevent spoilage of the food product. Coating compositions of preservatives generally have a high initial activity, which decreases steadily as the product ages.

Prior extrusion cooking methods have further not been able to admix large particulates into the composition. The intense mixing experiences in the typical extruder is under high shear which destroys the structural integrity of the particle. If the extruder is designed to avoid the destruction of the particles, proper mixing and cooking may not occur. Products intending to have large edible particles are generally prepared by extruding a substrate dough followed by a deposited layer of the particles and a superimposed dough layer to cover the particles.

There is, therefore, a need for a cooked cookie having heat labile additives uniformly dispersed throughout the cookie structure that has not been subjected to the destructive baking temperatures and high extruder pressures. The prior methods typically mix the cookie dough ingredients in the uncooked state and then form a dough into dough pieces for subsequent baking. The high baking temperatures generally destroy or deactivate many of the added compositions. Conventional extrusion cooking also subjects the additives to the deactivation temperatures.

The present invention is directed to a continuous method of preparing a cookie having heat or shear sensitive stabilized additives. Specifically, the invention relates to the extrusion heating of a high fat content cookie composition where the cookie composition is subjected to the high temperatures before the heat or shear sensitive additives are combined with the cookie composition. The cookie composition of the present invention is extruded under low pressure and baked to brown the surface of the cookie, cause the dough to rise and develop the crumb-like structure.

SUMMARY OF THE INVENTION

The present invention provides a continuous process for the production of cookies containing heat and/or shear sensitive additives and which exhibit a cookie crumb-like structure and retain their structural integrity using a cooker extruder, optional post extrusion mixing, and post extrusion heating, such as dielectric radio frequency baking, microwave baking, conductive baking, hot air baking, infra red heating, frying or combinations thereof. A cookie crumb-like structure is achieved by avoiding substantial starch gelatinization.

Ingredients comprising flour and shortening or fat are admixed and heated in a cooker extruder. Preferably, the starch carrying ingredients are coated with the oil, and then water is added to the hot flour and oil mass during and/or after heat treatment. Using an amount of water such that the water content of the dough-like mixture is sufficiently low so as to avoid substantial starch gelatinization further assures that no or substantially no starch gelatinization occurs. The use of low water contents also tends to reduce oil separation from hydrophilic cookie dough components at elevated temperatures.

In embodiments of the present invention the ingredients are heated in the cooker extruder to a high temperature, for example at least about 150° F., to reduce post extrusion baking time, and promote Maillard browning and flavor development. Preferably, the ingredients are heated to a temperature of at least about 200° F., more preferably at least about 250° F., most preferably from about 300° F. to about 500° F., to obtain a heat-treated mass. The heat treated mass is formed at a relatively low pressure within the cooker extruder, generally less than about 20 bars absolute, preferably less than about 10 bars absolute.

When a post extrusion mixer is used, the use of substantially the entire maximum available length of the extruder to heat treat the ingredients comprising oil, flour and optionally, at least one sugar permits significant production of Maillard reaction precursors. It further substantially reduces the amount of post extrusion heat treatment required for final baking of the output product. Also, thermal stress on the extruder screws may be reduced by maintaining a more even temperature profile in the extruder.

Preferably, the heat treated mass temperature upon addition of or during admixing with water or a liquid source of water is from about 100° F. to about 300° F., more preferably from about 110° F. to about 212° F. If the heat treated mass temperature is too low, viscosity may deleteriously increase, mixing may be more difficult, pressure may increase and substantial oil separation or surging may occur. At high viscosity or consistency, the shear sensitive additives may not be uniformly mixed and may suffer a loss of their structural integrity.

In embodiments of the present invention, the heat treated mass is cooled and admixed at low pressures with liquid water or a source of water and optional sugar either in the extruder or the post extrusion mixer to obtain a substantially homogeneous dough-like mixture. The admixing with the heat treated mass may be in the extruder or in a post extrusion or second stage mixing device. Post extrusion mixing devices which may be used include a continuous mixer or a second stage extruder or combinations thereof.

The heat treated mass is cooled to a sufficiently low temperature so that upon its encountering of points of high pressure, the added water does not cause substantial oil separation and extruder surging. Cooling of the heat treated mass is preferably initiated prior to and continues after addition of the water. The temperature of the dough-like mixture which is formed in the extruder or in the post extrusion mixing device is most preferably less than about 150° F. but above about 100° F. at the exit end of the cooker extruder or post extrusion mixer, respectively.

In embodiments of the invention a heat and/or shear sensitive additive is introduced into the extruder at a point downstream of the heating zone. In the preferred embodiment of the invention the heat sensitive additive is introduced into the extruder through the same port with other components, such as the water and a sugar component, either during or after cooling of the mass. The heat or shear sensitive additive may be preblended with another component, such as sugar, to be added during or after cooling of the mass. The simultaneous addition of components downstream of the heating zone helps to cool the mass in the extruder and prevent excessive deactivation of the heat sensitive additive. Regardless of the which port the heat sensitive additive is introduced through, the mass in the extruder should be at a temperature which will not cause excessive deactivation of heat sensitive additives. The mixing zone in the extruder downstream of the introduction of the heat or shear sensitive additive is sufficiently gentle and operates under low shear to avoid excessive heat generation and to avoid destruction of the shear sensitive components.

In the embodiments of the invention having a cooker extruder in cooperation with a post-extrusion mixing device, the heat and/or shear sensitive additive is introduced into the heat-treated mass in the post-extrusion mixer during and/or after cooling of the heat treated mass which is formed in the extruder. The post-extrusion mixer is operated to result in a short residence time and is operated at a sufficiently low temperature to prevent excessive deactivation of the heat sensitive additive. The mixer is also operated under sufficiently gentle mixing and low shear to prevent destruction of the shear sensitive additive.

The heat sensitive material may be a composition or blend of components. Exemplary heat sensitive materials include flavorants, fragrances, non-nutritive sweeteners, vitamins and mineral supplements. The shear sensitive additives may include chocolate and other flavor ships, nuts, candies, confectioneries, raisins and other dried fruit pieces.

The added shortening or fat content of the dough-like mixture may, for example be from about 12% by weight to about 40% by weight, preferably from about 20% by weight to about 30% by weight, based upon the weight of the dough-like mixture.

The elimination or significant reduction of added water or a source of added water in a cooker extruder tends to reduce oil separation form hydrophilic cookie dough components at elevated temperatures. It also reduces post extrusion heating time. However, added water or a source of water is needed in cookie production for formability or machinability of cookie doughs into sheets or pieces at high production rates. Water also helps to disperse cookie ingredients and to promote flavor and color development.

In the present invention, preferably the amount of water added is less than the amount needed to reach a threshold or maximum consistency. In preferred embodiments of the present invention, the amount of water added to the heat treated mass may range from about 05.% by weight to about 10% by weight, based upon the weight of the dough-like mixture. It may, for example, be from about 2% by weight to about 6% by weight, based upon the weight of the dough-like mixture, depending upon the heat treatment temperatures and the desired consistency for shaping or forming.

The water content of the dough-like mixture is preferably as low as possible to reduce post extrusion heating time and to reduce the risk of substantial oil separation and extruder surging. It is generally less than about 20% by weight, preferably less than about 15% by weight, more preferably less than about 10% by weight, based upon the weight of the dough-like mixture.

Process compatible ingredients can be added to adjust the texture of the products produced by the process of the present invention. For example, the relative amount of at least one solid, crystalline, or granulated sugar, such as sucrose, which is subjected to the heat treatment can be used to control the tenderness and crunchiness of the final product. Addition of a solid, or crystalline or granulated sugar, such as sucrose, and subjecting it to high extrusion temperatures tends to melt and/or dissolve the sugar crystals and thus promote a crunchy texture in the final product. Addition of all or a portion of the solid sugar to the cooled mass rather than subjecting it to high extrusion temperatures tends to avoid sugar melting and/or dissolution, and promotes a tender texture in the final product. In embodiments of this invention the sugar component may be added in an amount to provide, for example, from about 10% by weight to about 40% by weight, preferably from about 20% by weight to about 30% by weight total sugar solids, based upon the total weight of the dough-like mixture. Crystalline or granulated sucrose alone or used with other sugars is preferred.

Dough-like mixtures of the present invention are extrudable through a die into a continuous rope or sheet. The pressure drop upon extrusion or across the extruder die is generally less than about 20 bars absolute, preferably less than about 10 bars absolute. The work done on the dough-like mixture, defined as the specific mechanical energy is generally low, for example less than about 40 watt-hrs/kg (or 18 watt-hrs/lb). Preferably, substantial frictional heating does not occur in the cooker extruder with substantially all of the heating being provided by external or jacketed heaters.

Puffing or expansion due to moisture or steam release upon exiting of the dough-like mass from the cooker extruder or from the post extrusion mixer typically does not occur. The cooker extruder extrudate or the post extrusion mixer extrudate is formed into pieces and the pieces are leavened and further browned by subjecting them to at least one other heating source, such as a microwave oven, infrared oven, convection oven, dielectric radio frequency oven, a fryer, or conductive heater, to obtain cookie products which exhibit structural integrity and a crumb-like structure and texture. Generally, the volume increase upon post extrusion heating ranges from about 20% to about 200%.

Leavening agents are optional and may be included in amounts up to about 5% by weight, based upon the weight of the dough-like mixture. Dough-like mixtures of the present invention having a shelf-stable water activity of less than about 0.7, preferably less than about 0.6 may be packaged as shelf stable products in moisture and oxygen impermeable packaging materials for subsequent leavening and browning in conventional home microwave or convection ovens.

DETAILED DESCRIPTION OF THE INVENTION

In the present invention cookies are continuously produced using an extrusion cooker to continuously mix ingredients, to reduce post extrusion heating time, and to promote browning and flavor development. The dough-like mixture continuously produced in the extrusion cooker is leavened using at least one other energy source to obtain baked goods having a crumb-like structure or cookie crumb texture. The post extrusion leavening may be by microwave energy, dielectric radio frequency energy, infrared energy, conductive heating, frying, or heated air, such as from a convection oven or fluidized bed heater. In addition to leavening the composition, the post extrusion heating further browns the dough-like mixture.

In preferred embodiments of the present invention, the heat treated mass continuously produced in the extrusion cooker is transferred to a post extrusion or second stage mixing device where the mass can be cooled and mixed with water and additional ingredients, including heat and/or shear sensitive components, to form a dough-like mixture. In alternative embodiments of the invention, a heat sensitive or shear sensitive ingredient may be added to the mass in the extruder through a port downstream of the heating zone or in a cooling zone of the extruder. Regardless of where in the processing stream the heat and/or shear sensitive additives are added, the extruder or post extruder mixing conditions should be such that heat sensitive ingredients are not deactivated and the shear sensitive ingredients are not substantially reduced in size.

Separation of oil from the remaining mass and extruder surging are avoided preferably by admixing water into heat-treated ingredients comprising flour and oil which are at a temperature of about 100° F. to about 300° F., more preferably from about 110° F. to about 212° F. In embodiments of the present invention, water addition may be after and/or during substantial cooling of the heat treated ingredients. After the cooling of the heat treated ingredients, the post extrusion heating leavens the substantially unleavened extrudate. The volume increase resulting from the post extrusion heating or leavening step generally ranges from about 20% to about 200%, based upon the volume of the extrudate.

The cookie product prepared according to the present invention includes at least one heat sensitive additive or a shear sensitive additive. The heat sensitive additives may include, for example, vitamin and mineral supplements, non-nutritive sweeteners such as aspartame, flavors and fragrances. Shear sensitive additives may include, for example, nuts, raisins, chocolate and other flavor chips and confectioneries. Low moisture raisins and raisin pieces are generally preferred when the cookie mixture is leavened by microwave heating to reduce excessive puffing of the raisin.

In preparing cookies containing edible particles, such as chocolate chips or nut pieces, the dough is generally first formed followed by the addition of the edible pieces. It is important to uniformly disperse the particles to enable the formation of uniform cookies having a uniform appearance. Equally important is the visibility of the particles in the finished cookie. Edible particles that have fairly low melting points, such as chocolate drops, must be mixed at a low temperature to prevent melting and destruction of the pieces. Low melting particles of the present invention may be cooled or frozen before admixing with the composition.

In the present invention, the excess amounts of heat-sensitive components generally used in conventional practices are not necessary. The finished cookie product prepared according to the invention contains a substantial portion of the heat sensitive component in the active state. The method of the invention produces a cookie composition without subjecting the heat sensitive component to temperatures that cause degradation or inactivation of the flavors.

In the present invention, the term "heat-sensitive" is intended to refer to compositions or components that undergo a chemical decomposition or reaction into components which do not have the desired activity or characteristic flavor of the starting composition. Some heat-labile compositions, upon degradation, may result in the formation of undesirable compounds which produce an unpleasant taste or mouth feel and can affect the shelf stability of the food product. Heat-sensitive materials, within the scope of the invention, are also intended to refer to flavoring compositions that can change their physical integrity when heated, such as melting, volatilizing, or separation of components.

The method in one embodiment of the invention utilizes a cooker-extruder to heat treat the cookie mixture composition before the heat or shear sensitive additive is admixed in the extruder or a post extrusion mixer. During the heating of the cookie ingredients, intense mixing is required in the extruder to ensure proper mixing and heat treatment. Such intense mixing and high shear may grind the other additives to such small particles that it would reduce the consumer acceptance of the product. The method according to the present invention forms a heat treated mass in a cooker extruder and adds the heat and/or shear sensitive additives to the mass in the extruder after the heating step. The dough-like mixture formed in the extruder is mixed to uniformly distribute the additive without destruction or deactivation of the additive. Alternatively, the mass is transferred to a post extrusion mixing device for admixing with the additives. During and/or after cooling of the heat treated mass, the heat and/or shear sensitive additives are admixed under conditions such that the additives are not destroyed by high shear conditions or high temperatures. The temperature and consistency of the cookie mixture are adjusted appropriately to prevent loss of the additive. A dough-like mixture is formed in the extruder or alternatively in a post extrusion mixing device and has a consistency suitable for shaping and machining.

The partial baking of the cookie ingredients in the extruder and cooling the ingredients before the addition of the edible particles has several advantages over conventional batch methods. Specifically, the method is particularly advantageous in that the edible particles are not subjected to the long baking time associated with conventional methods. The cookie composition, according to the invention, is partially baked and heat treated in the extruder and therefore requires only a brief post-baking step compared to conventional cookie doughs.

The flour component may be any comminuted cereal grain or edible seed meal, derivatives thereof and mixtures thereof. Exemplary of the flour components which may be used are wheat flour, corn flour, oat flour, barley flour, rye flour, rice flour, potato flour, grain sorghum flour, corn starch, physically and/or chemically modified flours or starches, such as pregelatinized starches, and mixtures thereof. The flour may be bleached or unbleached. Wheat flour or mixtures of wheat flour with other grain flours are preferred. The amount of flour used in the compositions of the present invention ranges, for example, from about 30% by weight to about 70% by weight, preferably from about 45% by weight to about 55% by weight. Unless otherwise indicated, all weight percentages are based upon the total weight of all ingredients forming the dough-like mixtures or formulations of the present invention except for inclusions such as flavor chips, nuts, raisins, and the like. Thus, "the weight of the dough-like mixture" does not include the weight of inclusions.

The flour may be replaced in whole or in part by flour substitutes or bulking agents such as, polydextrose, hollocellulose, microcrystalline cellulose, mixtures thereof, and the like. Corn bran, wheat bran, oat bran, rice bran, mixtures thereof, and the like, may also be substituted in whole or in part for the flour for making a fiber enriched product, to enhance color, or to affect texture.

Corn flour and/or wheat bran may be used, for example, to enhance color and affect texture. Exemplary amounts range up to about 15% by weight corn flour and up to about 20% by weight wheat bran, the percentages being based upon the total weight of ingredients forming the dough-like mixture. Preferably, the corn flour and wheat bran will each comprise from about 1% to about 10% by weight, more preferably from about 2% by weight to about 5% by weight, based upon the weight of the dough-like mixture.

The shortening or fat used in the present invention may be any edible fat or oil or mixture thereof suitable for baking applications and may include conventional food-grade emulsifiers. Vegetable oils, lard, marine oils, and mixtures thereof which are fractionated, partially hydrogenated, and/or interesterified are exemplary of the shortenings or fats which may be used in the present invention. Edible reduced or low calorie, or non-digestible fats, fat substitutes, or synthetic fats, such as sucrose polyesters which are process compatible may also be used. The shortenings or fats may be solid or fluid at room temperatures of from about 75° F. to about 90° F. The use of components which are solid or semi-solid at room temperatures are preferred so as to avoid possible oil seepage from the final product during storage. The shortening or fat component is preferably added to the extruder in the form of a heated oil to facilitate metering, mixing, and a fast heat up of the added ingredients.

Generally, the amount of the shortening or fat component admixed with the flour component is, for example, at least about 12% by weight, and may, for example, go up to about 40% by weight, based upon the weight of the dough-like mixture. It preferably ranges from about 20% by weight to about 30% by weight, based upon the weight of the dough-like mixture.

Exemplary emulsifiers which can be used include lecithin, sorbitan monostearate, mono- and/or di-glycerides, polyoxyethylene sorbitan fatty acid esters, such as polysorbates (e.g., polyoxyethylene (20) sorbitan monostearate), and sodium stearoyl-2-lactate. Exemplary amounts are up to about 3% by weight of one or more emulsifiers based upon the weight of the flour.

Process compatible ingredients which can be used to modify the texture of the products produced in the present invention include sugars such as sucrose, fructose, lactose, dextrose, galactose, maltodextrins, corn syrup solids, hydrogenated starch hydrolysates, protein hydrolysates, mixtures thereof, and the like. Reducing sugars, such as fructose, maltose, lactose, and dextrose or mixtures of reducing sugars may be used to promote browning. Fructose is the preferred reducing sugar, because of its ready availability and its generally more enhanced browning and flavor development effects. Exemplary sources of fructose include invert syrup, corn syrup, high fructose corn syrup, molasses, brown sugar, maple syrup, mixtures thereof, and the like.

The texturizing ingredient, such as sugar may be admixed with the other ingredients in either solid or crystalline form, such as crystalline or granulated sucrose, granulated brown sugar, or crystalline fructose, or in liquid form, such as sucrose syrup or high fructose corn syrup. Humectant sugars, such as high fructose corn syrup, may be used to promote chewiness in the post-extrusion baked product.

In embodiments of the present invention, the total sugar solids content, or the texturizing ingredient content, of the dough-like mixtures of the present invention is, for example, at least about 10% by weight, and may, for example, go up to about 40% by weight, based upon the weight of the dough-like mixture. It preferably ranges from about 20% by weight to about 30% by weight, based upon the weight of the dough-like mixture.

Crystalline or granulated sucrose alone or with other sugars is preferred in the present invention. The sucrose content may, for example, be at least about 80% by weight, based upon the total sugar solids content of the dough-like mixture. The balance of the sugar solids may comprise fructose, dextrose, lactose, or mixtures thereof, for example. Sugar granulations which may be used range, for example, from about 4× to about 12×.

The moisture contents of the dough-like mixtures of the present invention should be sufficient to provide the desired consistency to enable proper forming, machining, and cutting of the dough. The total moisture content of the dough-like compositions of the present invention will include any water included as a separately added ingredient, as well as the moisture provided by flour (which usually contains about 12% to about 14% by weight moisture), and the moisture content of other dough additives included in the formulation, such as high fructose corn syrup, invert syrups, or other liquid humectants.

Taking into account all sources of moisture in the dough-like mixture including separately added water, the total moisture content of the dough-like mixtures of the present invention is generally less than about 20% by weight, preferably less than about 15% by weight, more preferably less than about 10% by weight, based upon the weight of the dough-like mixture. The dough-like compositions of the present invention generally have a water or moisture content of at least about 5% by weight, based upon the weight of the dough-like composition.

Generally, if the amount of added water is too low, the extrudate will tend to be slurry-like and cannot be cut into pieces. As the amount of water is increased the extrudate consistency increases, until a threshold level is reached. At this level, additional water reduces the consistency. However, as the amount of water is increased to reduce the consistency, there is an increased risk of substantial oil separation and extruder surging. The lower the pressure and/or temperature to which the heat treated mass is subjected to after water addition: the lower is the risk. Thus, adding an extrusion die to the extruder: a) increases the pressures encountered by the ingredients in the extruder which, b) increases the risk that the addition of water beyond the amount needed to reach the threshold level of consistency will result in oil separation which can reduce machinability.

The consistency of the extrudate can be determined by measuring the force needed to penetrate a sample at a constant rate of penetration. An Instron Texture Analyzer Model 4202 can be used to determine the modulus of the sample, which is a measurement of the consistency of the sample. The modulus is the slope, in the linear region, of a plot of the strain or deformation (x-axis) versus the stress (y-axis). The strain can be measured in inches and the stress can be measured in lbs force. A cylindrical shaped probe having a diameter of 4 mm can be used for the measurement of the consistency. The probe can be set to penetrate the sample at a constant speed of 0.2 inches/min. The sample dimensions can be about 1 inch square and ¼ inch high, or thick. The sample temperature can be room temperature (about 70°–75° F.) or higher. The more force required to penetrate the sample, the greater is its modulus and the greater is its consistency.

Consistencies suitable for forming or cutting operations depend upon the particular operation and particular equipment utilized. For example, a consistency which is too high for wire cutting may be suitable for sheeting or rotary molding. For rotary molding, the consistency at about the threshold level is suitable. For extrusion through a die, for producing a sheet for example, or for wire cutting, the consistency should be less than the threshold value. However, to reduce the risk of substantial oil separation in the extruder or in post extrusion forming operations and to reduce post extrusion baking times, it is generally preferred that the amount of water added be less than the amount needed to reach the threshold or maximum consistency. Thus, it is generally preferred that the water content of the dough-like mixture is such that additional water will increase the consistency of the dough-like mixture.

The consistency of the dough-like mixture is important in admixing of shear sensitive additives such as chocolate chips. If the consistency is too stiff, the structural integrity of the shear sensitive component may be destroyed. The temperature and water content of the dough-like mixture are generally sufficient to provide suitable shaping and forming of dough pieces without adversely affecting the shear sensitive additives.

If the ratios of the amounts of the other ingredients are kept constant then: the amount of water added which is needed to reach the threshold level of consistency will depend upon the heat treatment of the ingredients. Generally, the longer the heating, or the higher the temperature of heating, the lower is the amount of water needed to reach the threshold level of consistency.

In preferred embodiments of the present invention, the amount of water admixed with the heat treated mass may range, for example, from about 0.5% by weight to about 10% by weight, based upon the weight of the dough-like mixture. Depending upon the time and intensity of heat treatment and the consistency needed for shaping or forming, and the pressures involved, it may be more preferably from about 2% by weight to about 6% by weight, based upon the weight of the dough-like mixture.

The added water may be in the form of pure or tap water, a liquid source of water, such as sucrose syrup, corn syrup, high fructose corn syrup, eggs, honey, molasses, mixtures thereof, and the like, alone or in combination with a dry source of water, such as the moisture content of dried eggs, corn syrup solids, and the like. Water, in the form of tap water or a liquid source of water, such as high fructose corn syrup, for example, may also be added in the heat treating stage. It may be added with the flour for example, in low amounts (e.g. less than about 2% by weight, based upon the weight of the dough-like mixture) which do not result in: a) substantial oil separation or extruder surging or, b) substantial starch gelatinization.

In addition to the foregoing, the dough-like mixtures of the invention may include other additives conventionally employed in cookies. Such additives may include, for example, milk by-products, egg or egg by-products, cocoa, heat sensitive encapsulated additives, non-nutritive sweeteners, vitamin and mineral premixes, vanilla or other flavorings, as well as shear sensitive inclusions such as nuts, raisins, fruit pieces, caramel pieces, candy, candy coated confectioneries, fruit pieces, coconut, flavored chips such as chocolate chips, butterscotch chips and caramel chips, and the like.

Shear sensitive ingredients, such as chocolate chips or other flavored chips, confectioneries, raisins or other dried fruits, nuts, fruit pieces, caramel pieces, fondant pieces, candy, candy-coated confectioneries, butterscotch pieces, fruit jellies, or other inclusions or particulates are preferably added to the cooling stage in the extruder or the post extrusion mixer. The shear sensitive ingredients are most preferably added downstream of the downstream sugar and water addition. Adding the shear sensitive ingredients near the exit or in the last barrel section of the extruder serves to maintain particle integrity by reducing their exposure to the mechanical action of the screw elements. Flavor chips, such as chocolate chips may be added at temperatures below room temperature, for example at about 20° F. to about 65° F. so as to reduce melting of the chips in the dough-like mixture. The heat treated mass is generally cooled at least about 35° F., preferably at least about 50° F., and preferably to a temperature below the boiling point of water (212° F.), more preferably to a temperature lower than about 200° F., most preferably less than about 150° F. before the shear sensitive ingredient is added.

The size of the shear sensitive pieces can be in the range of about 1.0 mm to about 10 mm. The amount of the pieces added to the cookie composition can be, for example, up to about 50% by weight. The content will generally not exceed 30% by weight. The preferred range is from about 5.0% to about 30% by weight.

In one embodiment of the invention the shear sensitive particles may be selected having a particular melting point range in relation to the temperature of the composition in the second mixing zone. For example, high melting confectionery pieces should be selected to prevent excessive melting of the pieces during the mixing step. Alternatively, the cookie dough-like composition should be cooled to a temperature to prevent excessive melting of the additive. The temperature of the heat treated mass or dough-like composition may be reduced to about 100° F. before adding a heat sensitive additive. If desired, a marbleized product can be extruded by maintaining the temperature of the composition slightly above or at the melting point of the confectionery.

Heat-labile ingredients, such as vitamins, volatile flavors, fragrances, encapsulated additives such as gelatin capsules, minerals, non-nutritive sweeteners such as aspartame or saccharine, coloring agents and the like are preferably added to the cooling stage so as to reduce the possibility of thermal decomposition or degradation of the additive. The heat-labile ingredients may suitably be preblended with the sugar mix when the sugar is added downstream of the heating stage. It is desirable to reduce the temperature of the heat-treated mass below the decomposition temperature of the heat-labile ingredient before the ingredient is admixed. Generally, the heat treated mass is cooled at least about 35° F. and more preferably at least about 50° F. before the heat sensitive ingredient is admixed. The heat treated mass is preferably cooled to less than about 212° F., more preferably to less than about 200° F., most preferably to less than about 150° F. before the heat sensitive additive is admixed. The heat sensitive ingredients may be cooled to a temperature below room temperature of from about 20° F. to about 65° F. before being added to the heat treated mass. The heat sensitive ingredients may be included, for example, in amounts of up to about 15% by weight of the dough-like mixture. The actual amount of the additive included in the dough-like mixture will depend on the nature of the additive and the desired result.

The non-nutritive sweetener may be saccharine, sodium cyclamate, acesulfame K, cyclohexylamine, dihydrochalcone sweeteners, aspartame or other L-aspartic acid derivatives. A cookie composition containing a non-nutritive sweetener may include one or more sugars to control the taste, sweetness, and texture. A cookie composition deriving its sweetness from a sugar and aspartame blend exhibits suitable sweetness without the bitterness associated with the use of aspartame. A 50% replacement of the sugar with aspartame may be used to avoid the aspartame bitterness.

Non-nutritive sweeteners, such as aspartame, may be used with a bulking agent to replace the volume of the sugar. Suitable bulking agents may include, for example, cellulose, cellulose derivatives such as holocellulose and carboxymethyl cellulose, polydextrose, polyglycerol esters, polyethylene fatty acid ester, polymaltose, sucrose polyesters, hydrocolloids, cereal brans and vegetable fibers. The non-nutritive sweetener is generally included in an amount of 0.01% to about 1.0% by weight and more preferably 0.10% to about 1.0% by weight based on the total weight of the dough-like mixture. In one embodiment of the invention, the non-nutritive sweetener is included in an amount of about a 50% replacement of the normal sugar amount. This produces a sweetened cookie without the bitterness associated with some non-nutritive sweeteners.

The aspartame may be added to the extruder or to the post extrusion mixer as a solution or as a dry blend. The aspartame, alternatively, may be blended with the bulking agent before admixing with the heat treated mass. The bulking agent and aspartame is preferably added to the heat treated mass in the cooling zone of the extruder or in the continuous mixer. Adding the bulking agent to the hot mass may contribute to the cooling of the mass. All, none, or a portion of the bulking agent may be subjected to the heating step in the extruder provided the heat sensitive sweetener is added downstream of the heating zone.

In the embodiment the invention including a non-nutritive sweetener, aspartame in pure form is the preferred sweetener although other L-aspartic acid sweetening derivatives can be used. While L-aspartic acid sweetening derivatives which have been coated or encapsulated with edible materials to improve their flow characteristics and stability can be used, their increased cost makes them less desirable. In addition, the coatings often lower the dissolution rate and increase the caloric value of the food.

The L-aspartic acid sweetening derivative is preferably L-aspartyl-L-phenylalanine methyl ester (aspartame) because of its FDA approval. Other L-aspartic acid sweetening derivatives can be used, such as those disclosed in U.S. Pat. No. 3,955,000. The sweetener may be dry blended with the bulking agent and added to the extruder as a mix or mixed with a filler such as a starch. This procedure provides a uniform addition of the sweetener and reduces the risk of high concentrations of the sweetener in the finished product.

In an alternative embodiment, the L-aspartic acid sweetener derivative may be in the form of a solution prepared by first dry blending the sweetener with a pH adjuster. The dry blend is then added to water to form the solution. The water may be preheated to increase the solubility of the sweetener. Dry blending assures that the dry sweetener is added in an amount such that it is dissolved in the pH-adjusted aqueous solution. The concentration of the sweetener in the pH-adjusted solution may be about 0.1% to about 10% by weight of the final solution, depending upon solubility of the sweetener in water. In the case of aspartame, the concentration is about 0.1% to about 10%, preferably about 2% by weight aspartame based upon the weight of the final solution. The pH adjuster is added in an amount which results in an acidic pH which increases the solubility and stability of the sweetener in the aqueous solution. The pH used will depend upon the specific L-aspartic acid sweetener but it is generally less than about 7.0. It has been found that at a pH of about 2.0 to about 3.0, aspartame exhibits optimal stability and solubility in the aqueous solution. At a lower pH, particularly less than about 2.0, the stability of aspartame decreases. At a pH above about 7.0 the solubility of the aspartame decreases to an unsuitable level.

The temperature of the water to which the dry blend of sweetener and pH adjuster is added should be sufficiently high so that the preblend completely or substantially completely dissolves in water. However, it should be low enough so as not to adversely affect the stability of the sweetener. Generally, the water temperature should be in the range of from about 40° F. to about 210° F. For aspartame, water temperatures of from about 40° F. to about 210° F., preferably about 70° F. to about 160° F., most preferably about 85° F. to about 100° F. are used to dissolve the aspartame without substantial decomposition. By maintaining the aqueous solution of the sweetener at a temperature within the above ranges, crystallization of the sweetener from the solution prior to and/or during feeding of the solution to the extruder may be avoided.

The preferred pH adjusters for use in forming the solution are a citric acid and sodium citrate buffer system and malic acid. However, other known pharmaceutically acceptable inorganic or organic acids or buffering systems which do not adversely affect the taste of the dry comestible can also be used. The organic acids are preferred organoleptically over the inorganic acids. Exemplary of other suitable organic acids are fumaric acid, adipic acid, tartaric acid, and mixtures thereof. Malic acid is the preferred organic acid because it imparts a pleasant taste to the dry comestible. Exemplary of other suitable buffering systems are any of the above organic acids in combination with an alkali metal salt thereof.

The sweetening derivative is fed to the extruder at a rate which provides a level of acceptable sweetness in the finished dry comestible. For aspartame, a feed rate which provides an aspartame level of about 0.01% to about 1.0%, preferably 0.05% to about 1.0% by weight of the finished extruded product, provides an acceptable sweetness level. While some of the aspartame may decompose during processing, depending on extruder conditions and post-extrusion baking steps, the remaining amount should provide an acceptable level of sweetness.

The sweetener added in the form of an aqueous solution, has several disadvantages and limitations in the present invention. The amount of water that can be added to the composition without fat separation may limit the amount of sweetener that can be added to the composition. In addition, the sweetener aspartame has an optimum stability in an acidic medium. The Maillard browning reaction, on the other hand, has an optimum reaction rate in a basic medium and therefore browning may not be as intensive if the pH of the composition is too acidic. Maillard browning reactions in the food system of the present invention proceeds best at a pH of about 6 to about 9. An aqueous solution of aspartame is more preferably used after substantial browning occurs in the cooker extruder and in those compositions where less intensive browning would be offset by coloring, such as in chocolate or fudge cookies. A substantial portion of the aspartame contained in the composition prior to baking is retained in the extrusion process of the present invention. Flavoring, such as honey, cinnamon, and chocolate, have a tendency to degrade aspartame. If a flavoring causes decomposition to occur so as to result in an unacceptable sweetness level, higher initial aspartame levels could be used.

In embodiments of the invention containing a vitamin additive, the heat labile vitamin composition is generally a dry multi-vitamin premix. Dry compositions are preferred to avoid the addition of the carrier liquid to the cookie composition. Dry multi-vitamin premixes suitable for the invention may, for example, be such as those supplied by Hoffman LaRoche Company. The usual practice is to add a vitamin concentration of 2 to 4 times the USDA recommended daily allowance to ensure sufficient vitamin concentrations remain after processing and storage. During conventional heating and processing, as much as 75 to 100 percent of the vitamins can be lost from thermal degradation. In the preferred form of the invention, the vitamin premix is dry blended with the sugar component before admixing with the heat treated mass. This vitamin and sugar mix is then added to the extruder through a second dry feed port downstream of the heating zone and mixed into the composition.

A vitamin premix, such as that identified in Table 1, may be included in an amount of about 0.01% to about 0.25 by weight based on the total weight of the dough-like mixture. The preferred range for the vitamin premix may be about 0.02% to about 0.15% by weight based on the total weight of the dough-like mixture. The vitamin addition can be altered to meet any level of vitamin concentration desired. The typical concentration provides a therapeutically effective amount of the vitamin premix in a 1 ounce serving unit.

An exemplary multi-vitamin premix that may be used in this invention is shown in Table I.

TABLE I

| VITAMIN | CONCENTRATION RANGE FOR 100 GRAMS OF PREMIX |
| --- | --- |
| A | 5,632,770 IU |
| Niacinamide | 18,330 mg |
| Iron | 15,770 mg |
| Zinc | 16,670 mg |
| PYRIDOXINE HCL ($B_6$) | 2,330 mg |
| Riboflavin ($B_2$) | 1,030 mg |
| Thiamine HCl ($B_1$) | 400 mg |

The preferred vitamin premixes include one or more vitamins such as vitamin E, biotin, vitamin A, vitamin D, niacin, vitamin $B_6$, vitamin $B_2$, folic acid and minerals such as calcium, iron, zinc, copper, magnesium and phosphorous. The heat-labile vitamin premix preferably is added as a particular composition and mixed to disperse the composition uniformly throughout the heat-treated cookie composition. By using a dry premix, the amount of water added can be better controlled to obtain the proper consistency without fat separation. The dry vitamin premix alternatively may be mixed with starch or flour in the form of a vitamin enriched flour and metered into the extruder at a predetermined rate to provide an effective amount of the vitamins.

In an alternative embodiment, the vitamin may be an aqueous solution of a vitamin premix. The water in the vitamin premix consequently would have to be deducted from the separately added water. When an aqueous vitamin premix is added, additional water may not be necessary to provide a suitable consistency.

The optional heat sensitive flavor may be at ambient temperature or cooled to about 40° F. to 50° F. when admixed with the heat treated mass. The flavoring may include any conventional or commercially available flavoring in amounts of about 1% to about 15% by weight. Of particular interest are the heat-labile and volatile flavors, such as vanilla, that normally dissipate during baking and lose much of their characteristic odor and flavor. The artificial flavors are typically made up of a number of alcohol, ester and aromatic compounds with low boiling and flash points. Many of the compounds evaporate from the cookie during baking and flash-off when extruded at high temperatures and pressures. Natural flavors, by their nature, are more volatile than the artificial flavors and are lost to a greater extent during baking compared to the artificial flavors. In the past, the use of natural flavors has been cost prohibitive in commercial production of foods. The method of the invention provides an extrusion process that is able to economically use natural flavors in cookie products that could not have been previously economically produced. Suitable flavors that may be added to the heat treated mass include fruit juices or fruit juice concentrates such as fig juice, prune juice, apple juice, orange juice, grape juice and mixtures thereof.

A source of protein which is suitable for inclusion in baked goods may be included in the dough-like compositions of the present invention to promote Maillard browning. The source of protein includes non-fat dry milk solids, dried or powdered eggs, mixtures thereof, and the like. The amount of the proteinaceous source may, for example, range up to about 5% by weight, based upon the weight of the dough-like mixture.

The dough-like cookie compositions of the present invention may contain up to about 5% by weight of a leavening system, based upon the weight of the dough-like mixture. Chemical leavening agents or injected gases such as carbon dioxide can be used, but are not necessary for leavening the dough-like compositions of the present invention. Leavening action may be achieved by post extrusion heating of the composition which is sufficient to vaporize water in the dough-like cookie composition. However, the leavening agents may be used to adjust or control the degree of leavening and/or to control the pH of the cookie products.

The inclusion of a leavening agent or other edible pH-adjusting agents may promote browning of the cookie mixture during processing within the extruder or during post-extrusion heating. A desired pH for the cookies or the dough-like mass is from about 5 to about 9.5, preferably from about 7 to 8.5. Generally, the more alkaline the composition, the greater the degree of browning. However, the pH should be adjusted so as not to adversely affect taste of the final product. A higher pH may be used to promote browning when forming the heat treated mass of the present invention, followed by adjustment of the pH after and/or during cooling of the heat treated mass. Exemplary of chemical leavening agents or pH adjusting agents which may be used include alkaline materials and acidic materials such as sodium bicarbonate, calcium carbonate, ammonium bicarbonate, sodium acid pyrophosphate, tartaric acid, mixtures thereof, and the like.

In the process of the present invention, the flour component and shortening or fat are continuously and separately fed into the upstream portion of a cooker extruder. One or more crystalline or granulated sugars may be continuously added or preblended with the flour. However, continuous separate addition of the crystalline sugar to the upstream end of the extruder is preferred to avoid particle separation in the dry blend. The flour component, the shortening or fat, and the sugar components are generally initially conveyed in the extruder with cooling or without the application of external heat. They are conveyed and admixed while being heated to obtain a heat treated mass.

In the present invention, the ingredients may be heated to temperatures above the minimum gelatinization temperature of the starch (assuming that a sufficient amount of water was available for reaction with the starch) but no or substantially no gelatinization (measured by differential scanning calorimetry) occurs. It is desirable that the oil sufficiently coats the starch containing flour particles to prevent substantial penetration of moisture into the starch granules so as to avoid substantial gelatinization.

A cookie crumb-like structure is obtained by avoiding substantial starch gelatinization. Generally, starch gelatinization occurs when: a) water in a sufficient amount, generally at least about 30% by weight, based upon the weight of the starch, is added to and mixed with starch and, b) the temperature of the starch is raised to at least about 80° C. (176° F.), preferably 100° C. (212° F.) or more. The gelatinization temperature may depend upon the amount of water available for reaction with the starch. The lower the amount of available water, generally, the higher the gelatinization temperature. Gelatinization may be defined as the collapse (disruption) of molecular orders within the starch granule manifested in irreversible changes in property such as granular swelling, native crystallite melting, loss of birefringence, and starch solubilization. The point of initial gelatinization and the range over which it occurs is governed by starch concentration, method of observation, granule type, and heterogeneities within the granule population under observation. Pasting is the phenomenon following gelatinization in the dissolution of starch. It involves granular swelling, exudation of molecular components from the granule, and eventually, total disruption of the granules. See Atwell et al, "The Terminology And Methodology Associated With Basic Starch Phenomenon," *Cereal Foods World,* Vol. 33, No. 3, Pgs. 306–311 (March 1988).

In the present invention, conditions under which no or substantially no gelatinization is preferably achieved are by embedding or coating the starch carrying ingredients, such as wheat flour, within the oil and then adding the water to the flour and oil mass. No or substantially no gelatinization may also be further assured by: a) reducing or substantially eliminating the addition of water, and/or b) admixing the water with the heat treated mass below the minimum temperature at which starch gelatinization can occur.

In the process of the present invention, heating of the flour, shortening or fat, and sugar at as high a temperature as possible and for as long as possible for a maximum throughput rate without burning or other deleterious effects, is generally desirable for the development of browning and flavor. Maillard browning and flavor development involve the reaction between a reactive carbonyl group of a carbohydrate and a primary amino acid of the composition. The reaction proceeds through a series of intermediate reactions to finally produce the brown nitrogenous polymers. The heat treating step is believed to at least develop precursors to the polymeric nitrogen containing compounds. During the post-extrusion baking step, the colors develop faster than an uncooked dough under similar baking conditions.

Some edible particles tend to absorb heat and cause uneven baking during conventional microwave baking practices. For this reason, edible particles are generally avoided when conventional microwave baking is used. Edible particles having a high fat content, such as confectionery pieces, absorb microwave energy at a higher rate than the remaining portion of the dough which may cause burning or overheating of the confectionery before the dough is completely baked. The method of the invention, to the contrary, produces a substantially uniformly baked cookie when baked in a microwave oven regardless of the type or content of the particles. The heat treatment of the dough-like mixture reduces the post extrusion baking time sufficiently to prevent substantial loss of the heat labile additives.

The flour component, shortening or fat component, and optionally the sugar or other texturizing components are heated in the cooker extruder generally to a temperature of at least about 150° F., preferably at least about 200° F., more preferably at least about 250° F., and most preferably from about 300° F. to about 500° F. The average residence time for the flour, shortening or fat, and optional sugar components at these elevated temperatures is, for example: a) from about 25 seconds to about 150 seconds when a post extrusion mixer is used, and b) from about 15 seconds to about 90 seconds when a post extrusion mixer is not used.

The heat treated mass is formed at a relatively low pressure within the cooker extruder. Pressures during the heat treating stage are generally less than about 20 bars absolute, preferably less than about 10 bars absolute. It is believed that the use of low pressures in the cooker extruder reduces the tendency for oil to separate from the remaining cookie ingredients. Preferably, substantially no frictional heating occurs in the cooker extruder. Substantially all of the heating is preferably supplied by external or jacketed heating means. Generally, the work done in the production of the dough-like mixture is low, for example, less than about 40 watt hrs/kg (or less than about 18 watt hrs/lb).

The heat treated mass temperature before and/or during admixing with water or a liquid source of water should be sufficiently low so that the added water does not result in substantial separation of oil and extruder surging. The reduction of the temperature of the heat treated mass substantially reduces mobility and immiscibility of the water and oil phases. Also, it has been observed that the oil is most likely to separate from the remaining mass at the points of highest pressure, such as at the extruder die. Generally, the lower the pressures encountered by the heat treated mass upon or subsequent to the addition of the water, the less the heat treated mass needs to be cooled to avoid substantial oil separation and extruder surging.

If the heat treated mass temperature is too low upon and/or during admixing it with the water or liquid source of water, viscosity may deleteriously increase. This may result in mixing difficulties, pressure increases, and substantial oil separation and extruder surging. Additionally, the less cooling performed within the extruder, the less is the amount of post extrusion heating needed for leavening.

In embodiments where a post extrusion mixer is used the cooling of the heat treated mass may begin in the extruder or after extrusion in a post extrusion mixer. Post extrusion cooling is preferred because it provides for longer residence times at elevated temperatures in the extruder for flavor and color development. The use of substantially the entire maximum available length of the extruder to heat treat the ingredients comprising oil, flour and optionally, at least one sugar permits significant production of Maillard reaction precursors. It further substantially reduces the amount of post extrusion heat treatment required for final baking of the output product.

Also, thermal stress on the extruder screws may be reduced by maintaining a more even temperature profile in the extruder. The separation of the heat treatment zone of the first stage extruder from the lower temperature operation of the second stage mixing apparatus also eliminates the loss of heat by conduction through the screw shafts and the screw elements because the screw shafts of the first and second mixing stages are physically separate from one another.

If pressures are sufficiently low (such as when an extruder die is not utilized) and if the mass temperature during heat treatment is sufficiently low, no or substantially no cooling may be needed to avoid substantial oil separation or extruder surging. However, higher heat treated mass temperatures are preferred for: 1) the promotion of browning and flavor development, and 2) reduced post extrusion heating times. Thus, it is generally preferred that the heat treated mass be heated to a high temperature, for example about 300° F. to about 500° F., and that the heat treated mass temperature be reduced, as needed to avoid substantial oil separation or extruder surging, before and/or during admixing it with water or a liquid source of water. Cooling of the heat treated mass is preferably initiated prior to and continues during admixing it with water or a liquid source of water to reduce the risk of substantial oil separation upon mixing or extrusion.

Preferably, the heat treated mass temperature upon addition of water or a liquid source of water is from about 100° F. to about 300° F., more preferably from about 110° F. to about 212° F. Generally, the heat treated mass undergoes a temperature drop of at least about 35° F., preferably at least about 50° F. before and/or during admixing it with the water or liquid source of water. The heat treated mass is preferably cooled to a temperature below the boiling point of water (212° F.), more preferably to a temperature lower than about 200° F., most preferably less than about 150° F. before or during admixing it with the water or liquid source of water to reduce the risk of substantial steam generation, and substantial oil separation and extruder surging. Admixing the water or liquid source of water with the heat treated mass at a mass temperature which is lower than the minimum gelatinization temperature of the starches included in the formulation may further assure that no or substantially no starch gelatinization occurs, particularly as the amount of water is increased.

In the extruder or post extrusion mixer, the heat treated mass temperature is preferably reduced before the heat sensitive additives are admixed to prevent degradation. Shear sensitive additives may be added to any location in the extruder or post extrusion mixer provided the mixing does not destroy the structural integrity of the particles. The addition of the shear sensitive additives may also contribute to the cooling of the heat treated mass. The shear sensitive additive may, for example, be added to the post extrusion mixer through a feed port positioned about at the midpoint of the mixer. Shear sensitive and heat sensitive additives are preferably added to the extruder at a point about two-thirds down from the inlet when a single extruder is used. The temperature of the heat treated mass is suitably about 100° F. to about 200° F. before the heat or shear sensitive additive is admixed.

At the exit end prior to or at the optional extruder die or post extrusion mixer die, which is generally the point of maximum pressure, the temperature of the dough-like mixture which is formed in the cooker extruder or post extrusion mixer should be less than the boiling point of water (212° F.), more preferably less than about 200° F., most preferably less than about 150° F. Generally, the temperature of the heat treated mass and dough-like mixture in the extruder or post extrusion mixer should not be reduced to below about 100° F., for example, to avoid mixing difficulties, increased pressure, or increased risk of substantial oil separation or extruder surging due, for example, to increased viscosity or oil solidification. Also, excessively low extrudate temperatures may impair post extrusion forming, shaping, and cutting operations. Increased post extrusion heating times and/or temperatures for leavening purposes also result from excessive cooling.

In producing the dough-like mixtures in accordance with the present invention it is preferred that substantially no moisture content reduction occurs and that the dough-like mixture retains a sufficient amount of water for proper leavening during post extrusion heating.

All or a portion of the texturizing ingredient, such as solid, crystalline or granulated sugar, may be admixed with the cooled heat treated mass at the same or at a different location from addition of the water or other aqueous source to control the texture of the final baked product.

Addition of a solid, crystalline or granulated sugar, such as sucrose, and subjecting it to high extrusion temperatures tends to promote sugar melting and/or dissolution and thus a crunchy texture in the final product. Addition of all or a portion of the crystalline sugar to the cooled mass rather than subjecting it to high extrusion temperatures tends to avoid excessive sugar melting, and/or solubilization and promotes a tender texture in the final product. Thus, all, a portion (e.g. about 15% to about 85% by weight, based upon the total amount of solid, crystalline or granulated sugars), or none of the solid or crystalline sugars may be subjected to the heat treating stage to control texture in the final, post extrusion baked product.

Also, the greater the degree, or portion of sugar melting and/or dissolving, the less the viscosity of the extrudate. Accordingly, the relative amounts of solid or crystalline sugar: a) subjected to heat treatment upstream, and b) subjected only to the downstream cooling stage may be used to control the extrudate viscosity for subsequent forming or machining, and/or to control the texture of the final baked good.

The downstream or second stage addition of a texturizing ingredient, such as sugar, reduces the mass subjected to heat treatment which permits heating of the upstream ingredients to a higher temperature at a given throughput rate. Also, the downstream addition of the texturizing ingredient such as sugar, which is at a relatively low temperature (e.g. about room temperature) helps to cool the heat treated mass.

Various granulations may also be used to control the degree of sugar melting and/or dissolving, with larger sizes tending to result in less melting or dissolving. The addition of liquid sugar, such as sucrose syrup, may additionally promote crunchiness of the final product.

The residence time of the added liquid water or added liquid source of water, as well as the residence time of the texturizing ingredient, such as sugar, added downstream after initiation of the reduction of the heat treated mass temperature should be sufficient to enable the attainment of a substantially homogeneous dough-like mixture. The residence time in the cooling or reduced temperature stage should also be sufficiently long to reduce the mass temperature so as to avoid substantial expansion or puffing of the dough-like mass upon extrusion. The average residence time in the post extrusion mixer of the water and crystalline sugar added to the heat treated mass may, for example, be from about 60 seconds to about 180 seconds. When a cooker extruder is used without a post extrusion mixer, the average residence time in the cooker extruder of the water and crystalline sugar added to the heat treated mass may, for example, be from about 10 seconds to about 60 seconds.

Just prior to extrusion, or upon extrusion through an extruder die, the dough-like mixture formed in the extruder or in the post extrusion mixer may be heated, for example, by about 5° F. to about 30° F. This heating may be used to adjust dough consistency or viscosity provided that adverse oil separation or extruder surging does not occur. The post cooling heating may be used, for example, for controlling flow in the die, particularly at low moisture contents.

The pressure in the cooling stage is generally less than about 20 bars absolute, preferably less than about 10 bars absolute. The pressure drop across the extrusion die is generally less than about 20 bars and preferably less than about 10 bars. Low pressures are preferred to avoid separation of oil from the remaining mass and to avoid surging.

The leavening agents or pH adjusters may be added to the cooled mass in the cooling stage or they may be added prior to the cooling stage. They may be added in dry form either separately or as a pre-blend with the flour or solid or crystalline sugar, for example. They may also be added in aqueous form separately or as part of the added water. Emulsifiers may suitably be added with the shortening or fat in the heating stage or with the water in the cooling stage of the process of the present invention.

Ingredients which promote Maillard browning, such as proteinaceous materials and reducing sugars are preferably added in the heat treating stage. The dry ingredients may, for example, be preblended with the flour or added separately. The proteinaceous materials and the reducing sugars may also be added in the cooling stage depending upon the degree of browning desired, and the water content of the ingredients. These ingredients, as well as any other additives in dry form may be preblended with the upstream or downstream sugar, for example, or added separately therefrom. Likewise, additives which are in liquid form may be preblended with the added water or liquid source of water or they may be separately added to the extruder and/or post extrusion mixer. Generally, preblending of minor ingredients for addition to the extruder and/or post extrusion mixer is preferred for achieving homogeneity.

Heat labile ingredients, such as various vitamins, minerals, flavorings, coloring agents, sweeteners, such as aspartame, and the like, are preferably added in the cooling stage so as to reduce the possibility of thermal decomposition or degradation. The heat labile ingredients may, for example, be preblended with sugar added downstream in the cooling stage or with the added water. They may also be added separately, for instance downstream of the sugar or water addition. The heat sensitive ingredients may be added in an amount of up to about 15% by weight depending on the type of ingredient.

The dough-like mixture is extruded from the cooker extruder to obtain an extrudate without substantial moisture loss or flashing because the temperature of the dough-like mixture exiting the extruder is less than about 212° F. When a post extrusion mixer is used in embodiments of the present invention, the dough-like mixture is like-wise extruded from the post extrusion mixer extruder to obtain an extrudate without substantial moisture loss or flashing because the temperature of the dough-like mixture exiting the post extrusion mixer is less than about 212° F.

The extruded dough-like mixtures of the present invention will preferably have a shelf-stable water activity of less than about 0.7, preferably less than about 0.6. The shelf-stable compositions of the present invention may be packaged as shelf stable products in moisture and oxygen impermeable packaging materials for subsequent leavening and browning in a post extrusion oven such as a conventional home microwave or convection oven.

The dough-like mixture may exit the extruder or the post extrusion mixer through a die having various shapes, such as animal shapes, circles, squares, triangles, star-shapes, and the like. The extrudate may be cut at the die by a rotating knife for example, or by a wire cutting device.

The dough-like mixture may be formed into a continuous rope by the use of a round shaped die orifice. It may also be formed into a ribbon or sheet by the use of a horizontally oriented slit or elongated sheet shaped die orifice. The continuous ropes, ribbons, or sheets may be cut into pieces using known reciprocating cutters.

The dough-like mixtures of the present invention may be extruded without the use of a die plate. The thus obtained extrudate, or even die-extruded extrudates, may be formed into pieces using conventional dough-shaping and forming equipment, such as rotary molders, wire cutting machines, sheeting rolls and reciprocating cutters, and the like.

Unlike conventional cookie production, the extruded dough-like mixtures of the present invention are generally formed into pieces when hot. Excessive cooling of the extrudate may result in crumbling of the pieces upon wire cutting or other cutting or shaping operations. Preferably, the extrudates are formed into pieces at temperatures of from about 100° F. to about 150° F.

Consistency, viscosity and plasticity of the extrudates for proper machining may be adjusted, for example, by: a) water or oil addition or reduction in the extruder, b) water addition or reduction in the post extrusion mixer, or c) heating prior to the die, at the die, or after exiting from the die.

Cookie bits or cookie crumb-like products may be produced by extruding the dough-like mixture under very low pressure drops, e.g. without passing it through an extruder die, or at low die flow rates so that the extrudate spontaneously forms into pieces upon falling, onto a moving belt for example. Pieces or drops may also be produced by passing the dough-like mixture through a horizontal or vertical extruder die with a multitude of holes of a size of about ¼" to about ½". The extrudate strands may then be cut at the die by a rotating knife into cylindrically shaped preheated dough bits.

The pieces may then be leavened by post extrusion heating to form cookie-like pieces or bits. The bits may be screened or sized to obtain cookie bits or "cookie chips" having a substantially uniform size distribution.

The cookie bits or cookie chips may be incorporated into other products, such as "granola type" bars. They may be used to produce a "cookie chip chocolate" product: a) by incorporating the cookie chips or bits into molten chocolate in a mold and then solidifying the chocolate, b) by pouring molten chocolate over the bits in a mold, or c) by enrobing individual or a plurality of bits with melted chocolate. The cookie chips may, for example, have a maximum dimension of about ¼" to about ½". The amount of the cookie bits incorporated into the product may, for example, be from about 10% by weight to about 90% by weight, based upon the weight of the cookie chip chocolate product. The leavened cookie-like pieces or bits also may be: a) ground into crumbs for use in pie crusts, for example or, b) compacted, in a mold for example, to produce unitary cookie products.

The unleavened dough bits may also be compacted in a mold to obtain a unitary product which may be subsequently leavened. Bits having different sizes and/or compositions may be combined in the mold to produce the unitary products.

Filled products may be produced in accordance with the present invention by coextruding the dough-like mixture with filler materials. The coextrudate may be formed by the use of a concentric die or a tube inserted within the die orifice. Filled products may also be produced by transporting the dough-like mixture extrudate to a conventional enrobing or encrusting machine, such as produced by the Rheon Manufacturing Company for post extrusion filling with a filler material.

Examples of fillers which may be used include chocolate, vanilla, butterscotch, fruit, peanut butter, and cheese-flavored fillings. The filling material may also be a separately produced dough-like mixture for the production of multi-flavored, multi-colored, or multi-textured cookie products.

The extrudate pieces are leavened and further browned using: a) electromagnetic radiation or electronic heating, such as dielectric radio frequency heating, microwave heating, or infrared heating, b) heated air, such as from a convection oven or fluidized bed heater, c) frying, or d) combinations thereof. For example, a combination may comprise microwave heating or dielectric radio frequency heating for internal heating and infrared heating for more intense surface heating. The microwave, infrared, and radio frequency energy may be applied at pressures of from about 0.2 bars to about 6 bars.

When applying dielectric heating, the low conductive food product to be heated is placed between electrodes, which act as capacitor plates, and forms the dielectric of one or more capacitors. A high frequency voltage is applied across the electrodes. Alternating the electrostatic field or of the polarity of the voltage results in heating of the product.

The frequencies generally used for dielectric heating are about 2 to 90 MHz, e.g. about 13–14 MHz, about 27 MHz, or about 40–41 MHz. The frequencies generally used for microwave heating are, for example, about 2,450 MHz for domestic ovens and about 896 to 915 MHz for industrial ovens.

The heating of the pieces in the dielectric or radio frequency oven, microwave oven, or combinations thereof, or in a fryer is generally performed so that proper leavening and browning is achieved, for example, within about 90 seconds, preferably within about 60 seconds, depending upon the thickness and diameter of the pieces. Infrared heating, conductive heating, and hot air heating are generally conducted within about two to three minutes. Infrared heating should generally be performed subsequent to another form of post extrusion heating. It tends to heat the surface and form a skin which prevents leavening gases from escaping. Generally, the heating of the pieces or cookie preforms in the post extrusion oven should be sufficient to result in an internal temperature of at least about 160° F., preferably at least about 190° F. in the cookie.

Dielectric radio frequency ovens, microwave ovens, infrared ovens, hot air ovens, and the like which may be used are conventional, industrial scale continuous throughput ovens. Continuous, conventional fryers may also be used in embodiments of the present invention. Conductive heating devices which may be used include waffle-type conductive heaters.

The post extrusion heated, leavened products of the present invention have a water activity of less than about 0.7, preferably less than about 0.6. The water content of the products is generally less than about 6% by weight, suitably from about 2% by weight to about 4% by weight, based upon the weight of the post extrusion baked product, exclusive of inclusions. The products exhibit a cookie crumb-like structure appearance, and texture and structural integrity. Starch gelatinization (measured by differential scanning calorimetry) for the cookie products of the present invention is generally less than about 5%.

In the process of the present invention, a cooker extruder having two screws is preferably utilized. Preferably the screws of the extruder will be co-rotating, i.e., rotate in the same direction. Co-rotating twin screw elements, generally provide thorough mixing and conveying of the components, with the elements of one screw continuously wiping the other screw. This is particularly advantageous when the composition being mixed has a relatively high viscosity. Suitable extruders which may be used in the present invention include: (1)

WENGER model series TX by Wenger of Sabetha, Kansas, (2) model series MPF by Baker Perkins, (3) model series BC by Creusot Loire of Paris, France, and preferably 4) model series ZSK or Continua by Werner and Pfleiderer. Single screw extruders including those with a horizontally oscillating screw during rotation (i.e. a Buss kneader by Buss of Pratteln, Switzerland) may also be used in accordance with the present invention.

In embodiments of the present invention where a cooker extruder is without a post extrusion mixer, a preferred screw configuration which may be used in the present invention with a Werner and Pfleiderer model ZSK-57 twin screw cooker extruder is disclosed in U.S. patent application Ser. No. 362,375 entitled "Extruder Apparatus For Producing An At Least Partially Baked Product Having A Cookie-Like Crumb Structure," filed in the name of Bernhard Van Lengerich on June 7, 1989. The disclosure of the latter application is incorporated herein by reference in its entirety.

The heat treated mass, upon exiting the cooker extruder, may be further heated to promote further browning and flavor development and to reduce the amount of post extrusion heating needed for final baking of the output product, provided that adverse oil separation or extruder surging does not occur. This further heating may be up to an additional 200° F. for a short period of time, e.g., 5–10 seconds. For example, a microwave heating device may be placed between the extrusion cooker and the post extrusion mixer for heating the heat treated mass before it enters the post extrusion mixer. The minimal amount of final baking required due to the use of the entire length of the extruder for heat treatment and the further use of the microwave applicator permits the addition of heat sensitive ingredients to the formulation, for example, through a downstream feed port in the continuous mixer.

A microwave applicator which may be used is disclosed in U.S. patent application Ser. No. 372,384 entitled "Extruder And Continuous Mixer Arrangement For Producing An At Least Partially Baked Product Having A Cookie-Like Crumb Structure The Extruder Including A Microwave Applicator" filed in the name of Bernhard Van Lengerich on June 7, 1989 now abandoned in favor of Ser. No. 441,230 filed on Nov. 22, 1989. The disclosures of both applications are incorporated herein by reference in their entireties. As disclosed therein, the microwave applicator is formed as a continuation of the screw channel at the downstream most end of the extruder. The screw channel beyond the screw elements and within the microwave applicator is conformed to a round channel surrounded by a source of microwave energy. The residence time of the ingredients within the microwave applicator is relatively short, e.g., about 5–6 seconds.

The post extrusion mixer may be at least one additional extruder or one or more commercially available continuous mixers. The post extrusion mixers may be operated in series or parallel to each other. A continuous mixer, for use in the present invention comprises co-rotating screws and jacketed barrels with heating and/or cooling means. A continuous mixer is similar in construction to a cooker extruder except that for the same screw diameter, a continuous mixer has a greater free internal volume thus operates to mix and convey ingredients at relatively lower pressures and shear than does an extrusion cooker to obtain a substantially homogeneous output. A continuous mixer which may be used is model ZPM-120 by Werner and Pfleiderer.

An extruder is preferable as the second stage mixing device when a pressure build up is required for shaping, as for example, through an extrusion die. The extruder also permits an axial exit of the extrudate for unidirectional continuous processing. On the other hand, in a high volume production environment, a continuous mixer is preferred to provide a higher volumetric throughput and a better heat transfer from the ingredients for efficient and rapid cooling. A continuous mixer also permits a more efficacious particulate feeding.

Screw configurations which may be used in the present invention in embodiments where a cooker extruder is used in combination with a post extrusion mixer are disclosed in U.S. patent application Ser. No. 362,579 entitled "Extruder And Continuous Mixer Arrangement For Producing An At Least Partially Baked Product Having A Cookie-Like Crumb Structure" filed in the name of Bernhard Van Lengerich on June 7, 1989. The disclosure of the latter application is incorporated herein by reference in its entirety. Screw configurations which may be used in the present invention with a model ZSK-57 twin screw cooker extruder are shown in FIGS. 4 and 6 of said application. Screw configurations which may be used in the present invention with a second stage or post extrusion mixing device are shown in FIGS. 5 and 7 of said application. The FIG. 5 screw configuration may be used where the second stage mixing device comprises an extruder. The FIG. 7 screw configuration may be used with a model ZSK-120 continuous mixer as the second stage mixing device.

The extruder throughput or mass flow rates utilized in the present invention with a Werner and Pfleiderer ZSK 57 twin screw cooker extruder are suitably from about 150 lbs/hr to about 850 lbs/hr of extrudate. High rates may be achieved with other models. For example, a throughput rate of 6000 lbs/hr may be achieved using a Werner and Pfleiderer model Continua 120 cooker extruder.

The present invention is further illustrated in the following examples where all parts, ratios, and percentages are by weight and all temperatures are in ° F., unless otherwise stated:

EXAMPLE 1

The ingredients, excluding the walnuts, their feed placement, and their relative amounts used to prepare a cookie having a crumb-like structure and texture using extrusion heating and microwave baking in accordance with the present invention were:

| INGREDIENT AND PLACEMENT | WEIGHT % |
|---|---|
| Component 1: first dry feed port | |
| Wheat flour, bleached (about 12% by weight water) | 49.42 |
| Non-fat dry milk (about 52% by weight lactose) | 1.50 |
| Salt | 0.74 |
| Component 2: second dry feed port | |
| White sugar (sucrose), granulated | 15.58 |
| Brown sugar (about 89% sucrose, 3% invert, 4% non-sugar solids, 3% water) | 7.26 |
| Sodium Bicarbonate | .93 |
| Component 3: first liquid feed port | |
| Soybean spray oil | 22.34 |
| Component 4: second liquid feed port | |
| Tap water | 2.23 |

| -continued | |
|---|---|
| INGREDIENT AND PLACEMENT | WEIGHT % |
| Total | 100.00 |

The co-rotating twin screw cooker extruder used to prepare the cookie products of the present invention was a Werner and Pfeiderer ZSK-57 equipped with a screw configuration as shown and described in U.S. patent application Ser. No. 362,375 entitled "Extruder Apparatus For Producing An At Least Partially Baked Product Having A Cookie-Like Crumb Structure," filed in the name of Bernhard Van Lengerich on June 7, 1989. The extruder had twelve barrels, each provided with external, jacketed heating and cooling means. The dry feed port is set up at barrel 1 and open to the atmosphere. The first liquid feed port was set up between barrels 1 and 2.

The first barrel, which contained the first dry feed port, is not heated to obtain an actual barrel temperature of about 100° F. The remaining eleven barrels were divided into 7 separately measured barrel temperature zones. Barrels 2 and 3 corresponded to temperature zone 1, barrels 4 and 5 corresponded to zone 2, barrels 6, 7, and 8 corresponded to zones 3, 4, and 5, respectively, barrels 9 and 10 corresponded to temperature zone 6, and barrels 11 and 12 corresponded to temperature 7. Barrels 2 through 12 are set to heat to 300° F.

Paddles and screw elements were arranged on the screw shafts from upstream to downstream to provide: a) rapid conveying of the added dry ingredients in barrel 1, b) conveying of the dry ingredients and added oil and gradually increasing the degree of fill in barrel 2, c) chopping or mixing action for admixing the oil and dry ingredients, conveying to gradually increase the degree of fill, and mixing in barrel 3, d) repeated conveying and an increased degree of mixing in barrel 4, e) increased mixing, conveying and increased mixing to gradually increase the degree of fill in each of barrels 5 and 6, f) increased mixing, conveying, and increased mixing to provide the highest degree of mixing in barrel 7, g) fast conveying of the dry and liquid ingredients fed to the port in barrel 8, h) conveying with a gradual increase in degree of fill in barrel 9, i) conveying and mixing with a gradual increase in degree of fill in barrel 10, j) conveying and mixing in barrel 11, and k) conveying with a buildup in pressure sufficient to extrude the dough-like mixture through the extruder die. Gradually increasing the degree of fill tends to reduce points of high pressure which may cause oil separation.

The twin screw continuous mixer used to prepare the cookie products of the present invention was a Werner and Pfleiderer ZPM-120 equipped with a screw configuration as shown and described in U.S. patent application Ser. No. 362,579 entitled "Extruder And Continuous Mixer Arrangement For Production Of An At Least Partially Baked Product Having A Cookie-Like Crumb Structure," filed in the name of Bernhard Van Lengerich on June 7, 1989. The continuous mixer had four barrel sections fastened end-to-end, each provided with external jacketed heating and cooling means. The second dry feed port was set up at barrel 1 of the continuous mixer and was open to the atmosphere. The second liquid feed port was the same as the second dry feed port at barrel 1. The second liquid feed inlet pipe was inserted into the open port at barrel 1 so that the second dry feed ingredients and the second liquid feed ingredients were separately fed into the same open port. Relatively high pitch screw elements are arranged directly below the second dry ingredient feed port and second liquid inlet to convey the added ingredients downstream and away from the feed port. These elements rapidly convey the heat-treated mass from the extruder and the liquid and dry ingredients added to the continuous mixer via the second dry ingredient feed port in barrel 1 of the continuous mixer.

The rapid conveying screw sections of barrel 1 are followed by alternating kneading blocks with interposed screw sections in barrel 2 of the continuous mixer. The screw sections in barrel 2 are shorter and of lower pitch than the screw elements of barrel 1 so that, together with the kneading blocks, they act to lower the speed of conveyance and increase the degree of fill to permit thorough mixing by the kneading blocks in barrel 2. However, the number of alternating kneading blocks is fewer than in the extruder to provide a lower pressure and gentle mixing to protect the crystalline structure of the sugar grains.

The alternating kneading blocks are followed by three screw sections in barrel 3 of gradually decreasing pitch and length to feed the ingredients into final kneading blocks for final mixing in barrel 4. In barrel 4 a screw section is interposed between the kneading blocks, and a final screw section is arranged downstream from the kneading blocks to output the at least substantially homogeneous cookie dough from the continuous mixer. The exit portion of the continuous mixer was located at the bottom end portion of barrel 4.

A third dry feed port, open to the atmosphere, was formed in barrel 3 for input of shear-sensitive and/or heat-sensitive ingredients such as particulate ingredients, e.g., nuts, chocolate chips, etc. The screw sections below the third dry feed port increase the speed of conveyance of the ingredients which decreases the degree of fill and facilitates the intake and mixing of particulate materials by the kneading blocks in barrel 4.

The extruder screws were rotated at about 125 rpm at about 2% of maximum torque. The ingredients were fed in their relative amounts to provide a throughput or mass flow rate of the dough-like mixture extrudate of about 405 lbs/hr. The continuous mixer screws were rotated at about 60 rpm at about 19% of maximum torque.

Component 1 was prepared by mixing the ingredients to obtain a substantially homogeneous dry blend. The component 1 dry blend was continuously fed to the first dry feed port. Component 3 was prepared melting the semi-solid soybean spray oil to obtain a liquid oil which was continuously fed to the first liquid feed port.

On a calculated basis, the water content of the dough-like mixture formed in the extruder was about 8.3% by weight, based upon the total weight of the dough-like mixture.

At steady state, the barrel set temperatures and the actual barrel temperatures are:

| Barrel # | Barrel Set Temperature, °F. | Actual Barrel Temperature, °F. |
|---|---|---|
| 1 | cool | — |
| 2 | 300 | 205 |
| 3 | 300 | — |
| 4 | 300 | 202 |
| 5 | 300 | 202 |
| 6 | 300 | — |
| 7 | 300 | 300 |
| 8 | 300 | 270 |

| Barrel # | Barrel Set Temperature, °F. | Actual Barrel Temperature, °F. |
|---|---|---|
| 9 | 300 | — |
| 10 | 300 | 255 |
| 11 | 300 | — |
| 12 | 300 | 301 |

The pressure in the extruder was less than about 10 bars. The average or median residence time of the ingredients in the extruder is about 60 to 90 seconds.

The heat-treated mass is discharged from the extruder without the use of a die to a continuous mixer. The screws of the continuous mixer were rotated at about 60 rpm. The barrel sections 1, 2 and 3 were set on constant cool. Component 2 and component 4 were introduced to the continuous mixer through the second dry feed port and admixed with the heat-treated mass to form a dough-like mixture.

The dough-like mixture exits the continuous mixer and may be formed by using a cookie cutter. The diameter of the pieces is about 1¼ inch.

The barrel of the continuous mixer is cooled to about 140° F. by circulating water through the barrel jacket. Water and sugar are fed at a steady rate to the flour and fat slurry and mixed uniformly to form a dough-like consistency. Nut pieces were added to the continuous mixer through the third dry feed port in the barrel at a rate of 125 lbs/hr and uniformly mixed with the dough-like composition. The addition of the water and the suga contribute to the overall lowering of the temperature of the composition.

Six pieces were subjected to microwaving in a microwave oven for 50 seconds to produce distinctly leavened cookies having dimensions of about 1⅜" by about 1¼". The cookies will be surface browned and have a crumb-like structure and crumb-like texture.

EXAMPLE 2

The ingredients, their feed placement, and their relative amounts may be used to prepare a cookie having a crumb-like structure and texture using extrusion heating and microwave baking in accordance with the present invention are:

| INGREDIENT AND PLACEMENT | WEIGHT % |
|---|---|
| Component 1: first dry feed port | |
| Wheat flour, bleached (about 12% by weight water) | 47.85 |
| Non-fat dry milk (about 52% by weight lactose) | 1.44 |
| Salt | 0.74 |
| Component 2: second dry feed port | |
| Oat Bran | 21.87 |
| Aspartame | 0.24 |
| Component 3: first liquid feed port | |
| Soybean spray oil | 21.63 |
| Component 4: second liquid feed port | |
| Tap water | 6.23 |
| Total | 100.00 |

The co-rotating twin screw cooker extruder and the continuous mixer which may be used to prepare the cookie products of the present invention are as in Example 1.

The extruder screws may be rotated at about 125 rpm at about 2% of maximum torque. The ingredients may be fed in their relative amounts to provide a throughput or mass flow rate of the dough-like mixture extrudate of about 405 lbs/hr. The continuous mixer screws may be rotated at about 60 rpm.

Component 1 may be prepared by mixing the ingredients to obtain a substantially homogeneous dry blend. The component 1 dry blend may be continuously fed to the first dry feed port. Component 3 may be prepared by melting the semi-solid soybean spray oil to obtain a liquid oil which may be continuously fed to the first liquid feed port. Component 2 is prepared by mixing the ingredients to obtain a second substantially homogeneous dry blend which is continuously fed downstream to the second dry feed port. Component 4 is continuously fed to the second liquid feed port.

On a calculated basis, the water content of the dough-like mixture formed in the extruder is about 11.5% by weight, based upon the total weight of the dough-like mixture. The calculated amount of aspartame is about 0.25% by total weight of the dough-like mixture.

At steady state, the barrel set temperatures and the actual barrel temperatures typically may be:

| Barrel # | Barrel Set Temperature, °F. | Actual Barrel Temperature, °F. |
|---|---|---|
| 1 | cool | — |
| 2 | 300 | 205 |
| 3 | 300 | — |
| 4 | 300 | 202 |
| 5 | 300 | 202 |
| 6 | 300 | — |
| 7 | 300 | 300 |
| 8 | 300 | 270 |
| 9 | 300 | — |
| 10 | 300 | 255 |
| 11 | 300 | — |
| 12 | 300 | 301 |

The pressure in the extruder is less than about 10 bars. The average or median residence time of the ingredients in the extruder is about 60 to 90 seconds.

The heat-treated mass is discharged from the extruder without the use of a die to a continuous mixer. The screws of the continuous mixer were rotated at about rpm. The barrel sections 1, 2 and 3 were set on constant cool. Component 2 and component 4 are introduced to the continuous mixer through the second dry feed port and admixed with the heat-treated mass to form a dough-like mixture.

The dough-like mixture exits the continuous mixer and may be formed by using a cookie cutter. The diameter of the pieces is about 1¼ inch.

Six pieces may be subjected to microwaving in a microwave oven for 50 seconds to produce distinctly leavened cookies having dimensions of about 1⅜" by about 1¼". The cookies will be surface browned and have a crumb-like structure and crumb-like texture.

EXAMPLE 3

The ingredients, excluding the chocolate chips, their feed placement, and their relative amounts which may be used to prepare a cookie having a crumb-like structure and texture using extrusion heating and microwave baking in accordance with the present invention are:

| INGREDIENT AND PLACEMENT | WEIGHT % |
|---|---|
| Component 1: first dry feed port | |
| Wheat flour, bleached (about 12% by weight water) | 49.42 |

| INGREDIENT AND PLACEMENT | WEIGHT % |
| --- | --- |
| Non-fat dry milk (about 52% by weight lactose) | 1.50 |
| Salt | 0.74 |
| Component 2: second dry feed port | |
| White sugar (sucrose), granulated | 15.58 |
| Brown sugar (about 89% sucrose, 3% invert, 4% non-sugar solids, 3% water) | 7.26 |
| Sodium Bicarbonate | 0.93 |
| Component 3: first liquid feed port | |
| Soybean spray oil | 22.34 |
| Component 4: second liquid feed port | |
| Tap water | 2.23 |
| Total | 100.00 |

The co-rotating twin screw cooker extruder and the continuous mixer which may be used to prepare the cookie products of the present invention is a Werner and Pfleiderer ZSK-57 an a Werner and Pfleiderer ZPM-120 respectively, as in Example 1.

The extruder screws may be rotated at about 125 rpm at about 2% of maximum torque. The ingredients may be fed in their relative amounts to provide a throughput or mass flow rate of the dough-like mixture extrudate of about 405 lbs/hr.

Component 1 may be prepared by mixing the ingredients to obtain a substantially homogeneous dry blend. The component 1 dry blend may be continuously fed to the first dry feed port. Component 3 may be prepared by melting the semi-solid soybean spray oil to obtain a liquid oil which is continuously fed to the first liquid feed port.

On a calculated basis, the water content of the dough-like mixture formed in the extruder may be about 8.3% by weight, based upon the total weight of the dough-like mixture.

At steady state, the barrel set temperatures and the actual barrel temperatures typically may be:

| Barrel # | Barrel Set Temperature, °F. | Actual Barrel Temperature, °F. |
| --- | --- | --- |
| 1 | cool | — |
| 2 | 300 | 205 |
| 3 | 300 | — |
| 4 | 300 | 202 |
| 5 | 300 | 202 |
| 6 | 300 | — |
| 7 | 300 | 300 |
| 8 | 300 | 270 |
| 9 | 300 | — |
| 10 | 300 | 255 |
| 11 | 300 | — |
| 12 | 300 | 301 |

The pressure in the extruder is less than about 10 bars. The average or median residence time of the ingredients in the extruder is about 60 to 90 seconds.

The heat-treated mass is discharged from the extruder without the use of a die to a continuous mixer. The screws of the continuous mixer may be rotated at about 60 rpm. The first three barrel sections are set on constant cool. Component 2 and component 4 are introduced to the continuous mixer through the second dry feed port and admixed with the heat-treated mass to form a dough-like mixture. The chocolate chips are cooled to about 20.F and introduced to the continuous mixer through a third feed port disposed about at the midpoint of the continuous mixer. The cookie dough-like mixture is suitably cooled to about less than 120° F. before the chocolate chips are added.

The dough-like mixture exits the continuous mixer and may be formed by using a cookie cutter. The diameter of the pieces is about 1¼ inch.

The barrel of the continuous mixer is set on constant cool by circulating water through the barrel jacket. Water and sugar are fed at a steady rate to the flour and fat slurry and mixed uniformly to form a dough-like consistency. The chocolate chips are added to the continuous mixer through the third dry feed port in the barrel at a rate of about 125 lbs/hr and uniformly mixed with the dough-like composition. The addition of the water and the sugar contribute to the overall lowering of the temperature of the composition. The screw configuration in the continuous mixer include a number of conveying sections and kneading blocks that create a low shear environment to effectively mix the sugar and the nut pieces without destroying the structural integrity of the chocolate chips.

Six pieces may be subjected to microwaving in a microwave oven for 50 seconds to produce distinctly leavened cookies having dimensions of about 1⅜" by about 1¼". The cookies will be surface browned and have a crumb-like structure and crumb-like texture.

EXAMPLE 4

The ingredients, their feed placement, and their relative amounts which may be used to prepare a cookie having a crumb-like structure and texture using extrusion heating and microwave baking in accordance with the present invention are:

| INGREDIENT AND PLACEMENT | WEIGHT % |
| --- | --- |
| Component 1: first dry feed port | |
| Wheat flour, bleached (about 12% by weight water) | 49.88 |
| Non-fat dry milk (about 52% by weight lactose) | 1.50 |
| Salt | 0.75 |
| Component 2: second dry feed port | |
| White sugar (sucrose), granulated | 15.64 |
| Brown sugar (about 89% sucrose, 3% invert, 4% non-sugar solids, 3% water) | 7.29 |
| Vitamin mix | 0.13 |
| Component 3: first liquid feed port | |
| Soybean spray oil | 22.56 |
| Component 4: second liquid feed port | |
| Tap water | 2.25 |
| Total | 100.00 |

The co-rotating twin screw cooker extruder and the continuous mixer which may be used to prepare the cookie products of the present invention are as in Example 1.

The screws may be rotated at about 125 rpm at about 2% of maximum torque. The ingredients may be fed in their relative amount to provide a throughput or mass flow rate of the dough-like mixture extrudate of about 405 lbs/hr.

Component 1 may be prepared by mixing the ingredients to obtain a substantially homogeneous dry blend. The component 1 dry blend is continuously fed to the first dry feed port. Component 3 is prepared by melting the semi-solid soybean spray oil to obtain a liquid oil which may be continuously fed to the first liquid feed port. Component 2 is prepared by mixing the ingredients to obtain a second substantially homogeneous dry blend which is continuously fed downstream to the second dry feed port. Component 4 is continuously fed to the second liquid feed port.

On a calculated basis, the water content of the dough-like mixture formed in the extruder is about 8.3% by weight, based upon the total weight of the dough-like mixture.

At steady state, the barrel set temperatures and the actual barrel temperatures typically may be:

| Barrel # | Barrel Set Temperature, °F. | Actual Barrel Temperature, °F. |
|---|---|---|
| 1 | cool | — |
| 2 | 300 | 205 |
| 3 | 300 | — |
| 4 | 300 | 202 |
| 5 | 300 | 202 |
| 6 | 300 | — |
| 7 | 300 | 300 |
| 8 | 300 | 270 |
| 9 | 300 | — |
| 10 | 300 | 255 |
| 11 | 300 | — |
| 12 | 300 | 301 |

The pressure in the extruder is less than about 10 bars. The average or median residence time of the ingredients in the extruder is about 60 to 90 seconds. Tap water is passed through the barrels of the continuous mixer to cool the heat-treated mass from the extruder while admixing it with the other ingredients fed to the continuous mixer.

The heat-treated mass is discharged from the extruder without the use of a die to a continuous mixer. The screws of the continuous mixer were rotated at about 60 rpm. The last barrel section is set on constant cool. Component 2 and component 4 are introduced to the continuous mixer through the second dry feed port and admixed with the heat-treated mass to form a dough-like mixture.

The dough-like mixture exits the continuous mixer and may be formed by using a cookie cutter. The diameter of the pieces is about 1¼ inch.

Six pieces were subjected to microwaving in a microwave oven for 50 seconds to produce distinctly leavened cookies having dimensions of about 1⅞" by about 1¼". The cookies will be surface browned and have a crumb-like structure and crumb-like texture.

EXAMPLE 5

The ingredients, except for the walnuts, their feed placement, and their relative amounts which may be used to prepare a cookie having a crumb-like structure and texture using extrusion heating, post extrusion mixing and microwave baking in accordance with the present invention are:

| INGREDIENT AND PLACEMENT | WEIGHT % |
|---|---|
| Component 1: first dry feed port | |
| Wheat flour, bleached (about 12% by weight water) | 50.19 |
| Non-fat dry milk (about 52% by weight lactose) | 1.51 |
| Salt | 0.75 |
| Component 2: second dry feed port | |
| White sugar (sucrose), granulated | 15.82 |
| Brown sugar (about 89% sucrose, 3% invert, 4% non-sugar solids, 3% water) | 7.38 |
| Component 3: first liquid feed port | |
| Soybean spray oil | 22.53 |
| Component 4: second liquid feed port | |
| Tap water | 0.81 |
| Component 5: second dry feed port | |
| Sodium bicarbonate | 1.01 |
| Total | 100.00 |

The co-rotating twin screw cooker extruder which may be used to prepare the cookie products of the present invention was Werner and Pfleiderer ZSK-57 equipped with an extruder screw configuration as shown and described in U.S. patent application Ser. No. 362,579 entitled "Extruder And Continuous Mixer Arrangement For Production of An At Least Partially Baked Product Having A Cookie-Like Crumb Structure," filed in the name of Bernhard Van Lengerich on June 7, 1989. The extruder has twelve barrels, each provided with external, jacketed heating and cooling means. The first dry feed port is set up at barrel 1 was open to the atmosphere. The first liquid feed port is set up between barrels 1 and 2.

The first barrel, which contained the first dry feed port, is set on constant cool to obtain an actual barrel temperature of less than about 100° F. The remaining eleven barrels are divided into 7 separately measured barrel temperatures zones. Barrels 2 and 3 corresponded to temperature zone 1, barrels 4 and 5 corresponded to zone 2, barrels 6, 7, and 8 corresponded to zones 3, 4, and 5, respectively, barrels 9 and 10 corresponded to temperature zone 6, and barrels 11 and 12 corresponded to temperature zone 7. Barrels 2 through 12 are set to heat to 300° F.

Paddles and screw elements are arranged on the screw shafts from upstream to downstream to provide: a) rapid conveying of the added dry ingredients in barrel 1, b) conveying of the dry ingredients and added oil and gradually increasing the degree of fill in barrel 2, c) chopping or mixing action for admixing the oil and dry ingredients, conveying to gradually increase the degree of fill, and mixing in barrel 3, d) repeated conveying and an increased degree of mixing in barrel 4, e) increased mixing, conveying and increased mixing to gradually increase the degree of fill in each of barrels 5 and 6, f) increased mixing, conveying, and increased mixing to provide the highest degree of mixing in barrel 7, g) further conveying and vigorous mixing in barrels 8, 9, 10 and 11, and h) increased speed of conveyance to transport the heat treated mass out of the open end of the extruder. An extruder die is not utilized. Gradually increasing the degree of fill tends to reduce points of high pressure which may cause oil separation.

The twin screw continuous mixer which may be used to prepare the cookie products of the present invention was a Werner and Pfleiderer ZPM-120 equipped with a screw configuration as shown and described in U.S. patent application Ser. No. 362,579 entitled "Extruder And Continuous Mixer Arrangement For Production Of An At Least Partially Baked Product Having A Cookie-Like Crumb Structure," filed in the name of Bernhard Van Lengerich on June 7, 1989. The continuous mixer has four barrel sections fastened end-to-end, each provided with external jacketed heating and cooling means. The second dry feed port is set up at barrel 1 of the continuous mixer and was open to the atmosphere. The second liquid feed port is the same as the second dry feed port at barrel 1. The second liquid feed inlet pipe is inserted into the open port at barrel 1 so that the second dry feed ingredients and the second liquid feed ingredients are separately fed into the same open port. Relatively high pitch screw elements are arranged directly below the second dry ingredient feed port and second liquid inlet to convey the added ingredients downstream and away from the feed port. These elements rapidly convey the heat treated mass from the extruder and the liquid and dry ingredients added to the continuous mixer via the second dry ingredient feed port in barrel 1 of the continuous mixer.

The rapid conveying screw sections of barrel 1 are followed by alternating kneading blocks with interposed screw sections in barrel 2 of the continuous mixer. The screw sections in barrel 2 are shorter and of lower pitch than the screw element of barrel so that, together with the kneading blocks, they act to lower the speed of conveyance and increase the degree of fill to permit thorough mixing by the kneading blocks in barrel 2. However, the number of alternating kneading blocks is fewer than in the extruder to provide a lower pressure and gentle mixing to protect the crystalline structure of the sugar grains.

The alternating kneading blocks are followed by three screw sections in barrel 3 of gradually decreasing pitch and length to feed the ingredients into final kneading blocks for final mixing in barrel 4. In barrel 4 a screw section is interposed between the kneading blocks, and a final screw section is arranged downstream from the kneading blocks to output the at least substantially homogeneous cookie dough from the continuous mixer. The exit portion of the continuous mixer is located at the bottom end portion of barrel 4.

A third dry feed port, open to the atmosphere, is formed in barrel 3 for input of shear sensitive and/or heat sensitive ingredients such as particulate ingredients, e.g., nuts, chocolate chips etc. The screw sections below the third dry feed port increase the speed of conveyance of the ingredients which decreases the degree of fill and facilitates the intake and mixing of particulate materials by the kneading blocks in barrel 4.

The cooker extruder screws may be rotated about 130 rpm at about 1% of maximum torque. The continuous mixer screws may be rotated at about 60 rpm at about 19% of maximum torque. The ingredients are fed in their relative amounts to provide a throughput or mass flow rate of the dough-like mixture extrudate from the continuous mixer of about 297 lbs/hrs.

Component 1 is prepared by mixing the ingredients to obtain a substantially homogeneous dry blend. The component 1 dry blend is continuously fed to the first dry feed port. Component 2 is prepared by mixing the ingredients to obtain a second substantially homogeneous dry blend which is continuously fed downstream to the second dry feed port. Component 3 is prepared by melting the semi-solid soybean spray oil to obtain a liquid oil which is continuously fed to the first liquid feed port. Component 4 is continuously fed to the second liquid feed port. Component 5 is continuously fed to the second dry feed port, separate from component 2. Walnut pieces are continuously feed to the third dry feed port at a rate of 125 lbs/hr.

On a calculated basis, the water content of the dough-like mixture formed in the continuous mixer is about 7.1% by weight, based upon the total weight of the dough-like mixture.

At steady state, the barrel set temperatures and the actual barrel temperatures typically may be:

| Barrel # | Barrel Set Temperature, °F. | Actual Barrel Temperature, °F. |
|---|---|---|
| 1 | cool | — |
| 2 | 300 | 253 |
| 3 | 300 | — |
| 4 | 300 | 253 |
| 5 | 300 | 277 |
| 6 | 300 | — |
| 7 | 300 | 288 |
| 8 | 300 | 268 |
| 9 | 300 | — |
| 10 | 300 | 253 |
| 11 | 300 | — |
| 12 | 300 | 286 |

Tap water is passed through the barrels of the continuous mixer to cool the heat treated mass from the extruder while admixing it with the other ingredients fed to the continuous mixer.

The pressure in the extruder and in the continuous mixer is less than about 10 bars. The material temperatures in the extruder are typically about 217° F. at barrel 3, about 222° F. at barrel 5, about 196° F. at barrel 7 and about 281° F. at barrel 11. The average of median residence time of the ingredients heated in the cooker extruder is about 60–90 seconds. The average or median residence time of the ingredients in the continuous mixer from the second feed ports is about 90 to 150 seconds.

The heat treated mass formed in the cooker extruder is extruded without a die to obtain a slurry-like substantially homogeneous heat treated mass. The heat treated mass is permitted to fall into the second dry ingredient feed port (the upstream end of the continuous mixer). The extrudate temperature upon exiting the extruder about 201° F. The substantially homogeneous dough-like mixture formed in the continuous mixer is extruded from the mixer without a die to obtain a substantially unleavened extrudate. The dough-like mixture upon exiting the continuous mixer has a temperature of about 132° F. The dough-like mixture may be immediately transferred to an auger fed wire-cutting machine and cut into pieces while hot. The diameter of the pieces is about 1 inch.

Eight pieces may be subjected to microwaving in a microwave oven for 70 seconds to produce distinctly leavened cookies having a crumb-like structure and crumb-like texture.

EXAMPLE 6

The ingredients, their feed placement, and their relative amounts used to prepare a cookie having a crumb-like structure and texture using extrusion heating and microwave baking in accordance with the present invention were:

| INGREDIENT AND PLACEMENT | WEIGHT % |
|---|---|
| Component 1: first dry feed port | |
| Wheat flour, bleached (about 12% by weight water) | 49.88 |
| Non-fat dry milk (about 52% by weight lactose) | 1.50 |
| Salt | 0.75 |
| Component 2: second dry feed port | |

-continued

| INGREDIENT AND PLACEMENT | WEIGHT % |
|---|---|
| White sugar (sucrose), granulated | 14.72 |
| Brown sugar (about 89% sucrose, 3% invert, 4% non-sugar solids, 3% water) | 6.86 |
| Vanilla | 1.23 |
| Sodium bicarbonate | 0.25 |
| Component 3: first liquid feed port | |
| Soybean spray oil | 22.56 |
| Component 4: second liquid feed port | |
| Tap water | 2.25 |
| Total | 100.00 |

The co-rotating twin screw extruder which may be used in the present invention was a Werner and Pfleiderer Model ZSK-57 equipped with a screw configuration as shown and described in U.S. patent application Ser. No. 362,375 entitled "Extruder Apparatus For Producing An At Least Partially Baked Product Having A Cookie-Like Crumb Structure," filed in the name of Bernhard Van Lengerich on June 7, 1989. The extruder had twelve barrels, each provided with external, jacketed heating and cooling means. The first and second dry feed ports were set up at barrels 1 and 8, respectively. These two dry feed ports were open to the atmosphere. The first liquid feed port was set up between barrels 1 and 2. The second liquid feed port was the same as the second dry feed port at barrel 8. The second liquid feed inlet pipe was inserted into the open port at barrel 8 so that the second dry feed ingredients and the second liquid feed ingredients were separately feed into the same port.

The first barrel, which contained the first dry feed port, was set on constant cool. The remaining eleven barrels were divided into 7 separately measured barrel temperature zones. Barrels 2 and 3 corresponded to temperature zone 1, barrel 4 corresponded to zone 2, barrels 5 and 6 corresponded to zone 3, barrels 7 and 8 corresponded to zones 4, and 5, respectively, barrels 9 and 10 corresponded to temperature zone 6, and barrels 11 and 12 corresponded to temperature zone 7. The thermocouples for measuring actual barrel temperatures were located in barrels 2, 4, 5, 7, 8, 10, and 12.

Barrels 2 through 6 were set to heat to 350° F., barrel seven to 200° F., barrel eight was set on constant cool, barrels 9 and 10 were set at 100° F. and barrels 11 and 12 were set at 110° F.

Paddles and screw elements were arranged on the screw shafts from upstream to downstream to provide: a) rapid conveying of the added dry ingredients in barrel 1, b) conveying of the dry ingredients and added oil and gradually increasing the degree of fill in barrel 2, c) chopping or mixing action for admixing the oil and dry ingredients, conveying to gradually increase the degree of fill, and mixing in barrel 3, d) repeated conveying and an increased degree of mixing in barrel 4, e) increased mixing, conveying and increased mixing to gradually increase the degree of fill in each of barrels 5 and 6, f) increased mixing, conveying, and increased mixing to provide the highest degree of mixing in barrel 7, g) fast conveying of the dry and liquid ingredients fed to the port in barrel 8, h) conveying with a gradual increase in degree of fill in barrel 9, i) conveying and mixing with a gradual increase in degree of fill in barrel 10, j) conveying and mixing in barrel 11, and k) conveying with a buildup in pressure sufficient to extrude the dough-like mixture through the extruder die. Gradually increasing the degree of fill tends to reduce points of high pressure which may cause oil separation.

The screws were rotated at about 125 rpm at about 2% of maximum torque. The ingredients were fed in their relative amounts to provide a throughput or mass flow rate of the dough-like mixture extrudate of about 405 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed downstream to the second dry feed port. Component 3 was prepared by melting the semi-solid soybean spray oil to obtain a liquid oil which was continuously fed to the first liquid feed port. Component 4 was prepared by dissolving the sodium bicarbonate in the water to form a solution which was continuously fed to the second liquid feed port.

On a calculated basis, the water content of the dough-like mixture formed in the extruder was about 7.8% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 247 |
| 3 | 350 | — |
| 4 | 350 | 307 |
| 5 | 350 | 309 |
| 6 | 350 | — |
| 7 | 200 | 201 |
| 8 | <100 | 122 |
| 9 | 100 | — |
| 10 | 100 | 99 |
| 11 | 110 | — |
| 12 | 110 | 112 |

The pressure in the extruder was less than about 10 bars. The material temperatures in the extruder were about 230° F. at barrel 7, and about 131° F. at barrel 12. The average or median residence time of the ingredients heated prior to addition of components 2 and 4 at the second feed ports was about 40–50 seconds. The average or median residence time of the ingredients in the extruder from the second feed ports was about 10 to 20 seconds.

The substantially homogeneous dough-like mixture formed in the extruder was extruded through a horizontally oriented slit die (about 5 mm high) by about 50 mm wide) to obtain a continuous, substantially unleavened ribbon. The extrudate temperature upon exiting the extruder was about 125° F. The ribbon was cut into cylindrical pieces by hand, using a cookie cutter. The diameter of the pieces was about 1¼".

Six pieces were subjected to microwaving in a microwave oven for about 50 seconds to produce distinctly leavened cookies. A cookie sample had an internal temperature of about 217° F. upon microwaving. The cookies were surface browned and had a crumb-like structure and crumb-like texture.

EXAMPLE 7

The ingredients, their feed placement, and their relative amounts used to prepare a cookie having a crumb-like structure and texture using extrusion heating and microwave baking in accordance with the present invention were:

| INGREDIENT AND PLACEMENT | WEIGHT % |
|---|---|
| Component 1: first dry feed port | |
| Wheat flour, bleached (about 12% by weight water) | 45.72 |
| Non-fat dry milk (about 52% by weight lactose) | 1.37 |
| Salt | 0.69 |
| Component 2: second dry feed port | |
| White sugar (sucrose), granulated | 13.72 |
| Brown sugar (about 89% sucrose, 3% invert, 4% non-sugar solids, 3% water) | 6.40 |
| Nut pieces (walnut fluff) | 7.31 |
| Component 3: first liquid feed port | |
| Clarified butter | 20.58 |
| Component 4: second liquid feed port | |
| Sodium bicarbonate | 0.38 |
| Tap water | 3.83 |
| Total | 100.00 |

The co-rotating twin screw cooker extruder system of Example 6 was used to prepare the cookie products of the present invention.

The screws were rotated at about 225 rpm at about 5% of maximum torque. The ingredients were fed in their relative amounts to provide a throughput or mass flow rate of the dough-like mixture extrudate of about 218 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed downstream to the second dry feed port. Component 3 was prepared by =lting the semi-solid clarified butter to obtain a liquid oil which was continuously fed to the first liquid feed port. Component 4 was prepared by dissolving the sodium bicarbonate in the water to form a solution which was continuously fed to the second liquid feed port.

On a calculated basis, the water content of the dough-like mixture formed in the extruder was about 9.5% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 276 |
| 3 | 350 | — |
| 4 | 350 | 311 |
| 5 | 350 | 289 |
| 6 | 350 | — |
| 7 | 200 | 198 |
| 8 | cool | 100 |
| 9 | 100 | — |
| 10 | 100 | 100 |
| 11 | 120 | — |
| 12 | 120 | 122 |

The pressure in the extruder was less than about 10 bars. The average or median residence time of the ingredients heated prior to addition of components 2 and 4 at the second feed ports was about 40–50 seconds. The average or median residence time of the ingredients in the extruder from the second feed ports was about 10 to 20 seconds.

The substantially homogeneous dough-like mixture formed in the extruder was extruded through a horizontally oriented slit die (about 5 mm high) by about 50 mm wide) to obtain a continuous, substantially unleavened ribbon. The extrudate temperature upon exiting the extruder wa less than about 150° F. The ribbon was cut into cylindrical pieces by hand, using a cookie cutter. The diameter of the pieces was about 1¼".

Six pieces were subjected to microwaving in a microwave oven for about 50 seconds to produce distinctly leavened cookies. The cookies were surface browned and had a crumb-like structure and crumb-like texture.

EXAMPLE 8

The ingredients, their feed placement, and their relative amounts used to prepare a cookie having a crumb-like structure and texture using extrusion heating and microwave baking in accordance with the present invention were:

| INGREDIENT AND PLACEMENT | WEIGHT % |
|---|---|
| Component 1: first dry feed port | |
| Wheat flour, bleached (about 12% by weight water) | 49.88 |
| Non-fat dry milk (about 52% by weight lactose) | 1.50 |
| Salt | 0.75 |
| Component 2: second dry feed port | |
| White sugar (sucrose), granulated | 15.64 |
| Brown sugar (about 89% sucrose, 3% invert, 4% non-sugar solids, 3% water) | 7.29 |
| Vitamin mix | 0.13 |
| Component 3: first liquid feed port | |
| Soybean spray oil | 22.56 |
| Component 4: second liquid feed port | |
| Tap water | 2.25 |
| Total | 100.00 |

The co-rotating twin screw cooker extruder system of Example 6 was used to prepare the cookie products of the present invention.

The screws were rotated at about 125 rpm at about 2% of maximum torque. The ingredients were fed in their relative amounts to provide a throughput or mass flow rate of the dough-like mixture extrudate of about 203 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed downstream to the second dry feed port. Component 3 was prepared by melting the semi-solid soybean spray oil to obtain a liquid oil which was continuously fed to the first liquid feed port. Component 4 was continuously fed to the second liquid feed port.

On a calculated basis, the water content of the dough-like mixture formed in the extruder was about 8.5% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 228 |
| 3 | 350 | — |
| 4 | 350 | 283 |
| 5 | 350 | 340 |
| 6 | 350 | — |
| 7 | 200 | 200 |
| 8 | <100 | 138 |
| 9 | 100 | — |
| 10 | 100 | 98 |
| 11 | 110 | — |
| 12 | 110 | 111 |

The pressure in the extruder was less than about 10 bars. The material temperatures in the extruder were about 236° F. at barrel 7, and about 135° F. at barrel 12. The average or median residence time of the ingredients heated prior to addition of components 2 and 4 at the second feed ports was about 40-50 seconds. The average or median residence time of the ingredients in the extruder from the second feed ports was about 10 to 20 seconds.

The substantially homogeneous dough-like mixture formed in the extruder was extruded through a horizontally oriented slit die (about 5 mm high) by about 50 mm wide) to obtain a continuous, substantially unleavened ribbon. The extrudate temperature upon exiting the extruder was about 143° F. The ribbon was cut into cylindrical pieces by hand, using a cookie cutter. The diameter of the pieces was about 1¼".

Six pieces were subjected to microwaving in a microwave oven for about 50 seconds to produce distinctly leavened cookies. A cookie sample had an internal temperature of about 227° F. upon microwaving. The cookies were surface browned and had a crumb-like structure and crumb-like texture.

EXAMPLE 9

The ingredients, their feed placement, and their relative amounts used to prepare a cookie having a crumb-like structure and texture using extrusion heating and microwave baking in accordance with the present invention were:

| INGREDIENT AND PLACEMENT | WEIGHT % |
|---|---|
| Component 1: first dry feed port | |
| Wheat flour, bleached (about 12% by weight water) | 55.00 |
| Non-fat dry milk (about 52% by weight lactose) | 1.65 |
| Salt | 0.83 |
| Component 2: second dry feed port | |
| White sugar (sucrose), granulated | 8.80 |
| Brown sugar (about 89% sucrose, 3% invert, 4% non-sugar solids, 3% water) | 3.85 |
| Aspartame | 0.06 |
| Component 3: first liquid feed port | |
| Clarified butter | 24.75 |
| Component 4: second liquid feed port | |
| Tap water | 5.06 |
| Total | 100.00 |

The co-rotating twin screw cooker extruder sysem of Example 6 was used to prepare the cookie products of the present invention.

The screws were rotated at about 225 rpm at about 8% of maximum torque. The ingredients were fed in their relative amounts to provide a throughput or mass flow rate of the dough-like mixture extrudate of about 181 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogeneous dry blend which was continuously fed downstream to the second dry feed port. Component 3 was prepared by melting the semi-solid clarified butter to obtain a liquid oil which was continuously fed to the first liquid feed port. Component 4 was continuously fed to the second liquid feed port.

On a calculated basis, the water content of the dough-like mixture formed in the extruder was about 11.8% by weight, based upon the total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 298 |
| 3 | 350 | — |
| 4 | 350 | 335 |
| 5 | 350 | 290 |
| 6 | 350 | — |
| 7 | 200 | 195 |
| 8 | cool | 100 |
| 9 | 100 | — |
| 10 | 100 | 100 |
| 11 | 120 | — |
| 12 | 120 | 119 |

The pressure in the extruder was less than about 10 bars. The average or median residence time of the ingredients heated prior to addition of components 2 and at the second feed ports was about 40-50 seconds. The average or median residence time of the ingredients in the extruder from the second feed ports was about 10 to 20 seconds.

The substantially homogeneous dough-like mixture formed in the extruder was extruded through a horizontally oriented slit die (about 5mm high) by about 50 mm wide) to obtain a continuous, substantially unleavened ribbon. The extrudate temperature upon exiting the extruder was less than about 150° F. The ribbon was cut into cylindrical pieces by hand, using a cookie cutter. The diameter of the pieces was about 1¼".

Six pieces were subjected to microwaving in a microwave oven for about 50 seconds to produce distinctly leavened cookies. The cookies were surface browned and had a crumb-like structure and crumb-like texture.

EXAMPLE 10

The ingredients, their feed placement, and their relative amounts used to prepare a cookie sweetened with aspartame and having a crumb-like structure and texture using extrusion heating and microwave baking in accordance with the present invention were:

| INGREDIENT AND PLACEMENT | WEIGHT % |
|---|---|
| Component 1: first dry feed port | |
| Wheat flour, bleached (about 12% by weight water) | 47.85 |

| INGREDIENT AND PLACEMENT | WEIGHT % |
|---|---|
| Non-fat dry milk (about 52% by weight lactose) | 1.44 |
| Salt | 0.74 |
| *Component 2: second dry feed port* | |
| Oat Bran | 21.87 |
| Aspartame | 0.24 |
| *Component 3: first liquid feed port* | |
| Soybean spray oil | 21.63 |
| *Component 4: second liquid feed port* | |
| Tap water | 6.23 |
| Total | 100.00 |

The co-rotating twin screw cooker extruder system of Example 6 were used to prepare the cookie products of the present invention.

The screws were rotated at about 125 rpm at about 2% of maximum torque. The ingredients were fed in their relative amounts to provide a throughput or mass flow rate of the dough-like mixture extrudate of about 405 lbs/hr.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogenous dry blend which was continuously fed downstream to the second dry feed port. Component 3 was prepared by melting the semi-solid soybean spray oil to obtain a liquid oil which was continuously fed to the first liquid feed port. Component 4 was continuously fed to the second liquid feed port.

On a calculated basis, the water content of the dough-like mixture formed in the extruder was about 11.5% by weight, based upon the total weight of the dough-like mixture. The calculated amount of aspartame was 0.25% by total weight of the dough-like mixture.

At steady state, the barrel set temperatures and the actual barrel temperatures were:

| Barrel # | Barrel Set Temperature, °F. | Actual Barrel Temperature, °F. |
|---|---|---|
| 1 | cool | — |
| 2 | 350 | 247 |
| 3 | 350 | — |
| 4 | 350 | 293 |
| 5 | 350 | 340 |
| 6 | 350 | — |
| 7 | 200 | 200 |
| 8 | cool | 112 |
| 9 | 100 | — |
| 10 | 100 | 104 |
| 11 | 120 | — |
| 12 | 120 | 115 |

The pressure in the extruder was less than about 10 bars. The average or median residence time of the ingredients heated prior to addition of components 2 and 4 at the second feed ports was about 40–50 seconds. The average or median residence time of the ingredients in the extruder from the second feed ports was about 10 to 20 seconds.

The substantially homogeneous dough-like mixture formed in the extruder was extruded through a horizontally oriented slit die (about 5mm high) by about 50 mm wide) to obtain a continuous, substantially unleavened ribbon. The extrudate temperature upon exiting the extruder was less than about 150° F. The ribbon was cut into cylindrical pieces by hand, using a cookie cutter. The diameter of the pieces was about 1¼".

Six pieces were subjected to microwaving in a microwave oven for about 50 seconds to produce distinctly leavened cookies. The cookies were surface browned and had a crumb-like structure and crumb-like texture and a distinct sweet taste. A loss of sweetness was not noted. The internal temperature of a cookie upon exiting the microwave was 189° F.

What is claimed is:

1. A method for the continuous production of a cookie-like product having a leavened, crumb-like structure and uniformly distributed heat or shear sensitive edible additives, said method comprising
   (a) blending at least one flour with fat or shortening in an extruder and heating to a temperature of at least 150° F. to promote browning and to form a heat-treated mass;
   (b) admixing water with the heat-treated mass at a heat-treated mass temperature of from about 100° F. to about 300° F.;
   (c) admixing at least one heat or shear sensitive edible additive with sufficient mixing to uniformly distribute the particles and form a cookie mixture;
   (d) extruding the cookie mixture and forming the cookie mixture into substantially unleavened pieces; and
   (e) leavening the pieces by heating.

2. The method of claim 1 further comprising admixing at least one sugar with the heat treated mass.

3. The method of claim 2 wherein at least one sugar is admixed with the flour and fat and subjected to said heating to form said heat treated mass.

4. The method of claim 1 wherein said heat treated mass is transferred to a post extrusion mixing device before admixing said heat or shear sensitive additive.

5. The method of claim 1 comprising reducing the temperature of the heat treated mass before admixing the heat or shear sensitive additive.

6. The method of claim 4 wherein at least one solid sugar is admixed with the heat treated mass in the post extrusion mixing device.

7. The method of claim 1 further comprising admixing at least one bulking agent with the heat treated mass and wherein said edible additive is a heat sensitive, non-nutritive sweetener.

8. The method of claim 7 wherein said bulking agent is selected from the group consisting of cellulose, cellulose derivatives, cereal bran, polydextrose, polymaltose, sucrose polyesters, and hydrocolloids.

9. The method of claim 1 wherein the cookie mixture further includes up to about 5% by weight of at least one chemical leavening agent selected from the group consisting of sodium bicarbonate, calcium carbonate, sodium acid pyrophosphate, ammonium bicarbonate, and tartaric acid.

10. The method of claim 1 wherein said cookie mixture comprises about 30% to about 70% by weight flour, 10% to 40% by weight sugar, 12% to 40% by weight fat or shortening, and less than about 20% water by weight.

11. The method of claim 1 wherein the flour and fat or shortening are heated to at least about 200° F. to form said heat treated mass.

12. The method of claim 1 wherein a source of water is added to the heat treated mass in an amount sufficient to adjust the consistency and to produce a cookie dough-like mixture, wherein the water is added under sufficiently low pressure and temperature such that substantial fat separation is inhibited.

13. The method of claim 12 wherein said dough-like mixture is extruded at a temperature of about 100° F. to about 150° F. and a pressure of less than about 5 bars, whereby substantial expansion, fat separation and deactivation of the heat sensitive additives are inhibited.

14. The method of claim 12 wherein the consistency of said cookie mixture is sufficiently low so as not to inhibit admixing of said shear sensitive additives 15. A method as claimed in claim 14 wherein the temperature of said cookie dough-like mixture is about 100° F. to about 150° F. before admixing said shear sensitive additives.

16. The method of claim 1 wherein said edible additives include at least one shear sensitive additive selected from the group consisting of chocolate pieces, caramel pieces, fondant pieces, candy, candy coated confectioneries, raisins, dried fruit pieces, fruit jellies, nuts, and butterscotch pieces.

17. The method of claim 16 wherein said edible additives are admixed in an amount of about 5% to 30% by weight of the cookie mixture.

18. The method of claim 16 wherein said edible additives are particles having a particle size of about 1 mm to about 10 mm.

19. The method of claim 16 wherein said edible additives are cooled to about 20° F. to about 40° F. before admixing with said heat treated mass.

20. The method of claim 1 wherein said additive is at least one heat sensitive additive selected from the group consisting of flavors, fragrances, viamins, saccharine, acesulfame K, sodium cyclamate, cyclohexylamine, dihydrochalcone sweeteners, and L-aspartic acid sweetener derivatives.

21. The method of claim 20 wherein said heat sensitive additive is admixed in an amount of less than 15% by weight of the cookie mixture.

22. The method of claim 1 wherein said additive comprises a heat sensitive vitamin mix which is admixed with the heat treated mass in an amount of about 0.01% by weight to about 0.25% by weight, based on the total weight of the cookie mixture.

23. The method of claim 1 wherein said additive comprises a heat sensitive vitamin mix which includes a therapeutic amount of at least one vitamin selected from the group consisting of Vitamin A, Vitamin D, Iron, Zinc, Niacin, Vitamin $B_6$, Vitamin $B_2$ Folic acid, Calcium and Magnesium.

24. The method of claim 1 wherein said additive comprises a heat sensitive dry multi-vitamin premix which is added at a flow rate sufficient to enrich a serving unit of said cookie mixture with a therapeutic amount of said dry multi-vitamin premix.

25. The method of claim 1 wherein said additive comprises a flavor which is added to the heat-treated mass at a steady rate to provide a flavor content of about 1% to about 15% by weight of the cookie mixture.

26. The method of claim 1 wherein said additive comprises a flavor which is selected from the group consisting of vanilla and fruit juice concentrates.

27. The method of claim 20 wherein said heat treated mass is at a temperature of about 100° F. to about 150° F. before admixing the heat sensitive additive whereby deactivation is substantially inhibited.

28. The method of claim 1 wherein at least one reducing sugar is combined with the flour and fat and subjected to the heating step to promote Maillard browning.

29. The method of claim 1 wherein at least one protein source is combined with the flour and fat and subjected to the heating step to promote Maillard browning.

30. The method of claim 1 wherein said cookie pieces are leavened by heating in a convection oven, microwave oven, or dielectric radio frequency oven.

31. A method as claimed in claim 1 wherein the flour and fat are heated to a temperature of at least about 200° F. for about 20 seconds to about 120 seconds.

* * * * *